US012677335B2

(12) United States Patent
Tanaka et al.

(10) Patent No.: US 12,677,335 B2
(45) Date of Patent: Jul. 7, 2026

(54) COMMUNICATION DEVICE AND COMMUNICATION METHOD

(71) Applicant: Sony Group Corporation, Tokyo (JP)

(72) Inventors: Yusuke Tanaka, Tokyo (JP); Ken Tanaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 782 days.

(21) Appl. No.: 17/920,408

(22) PCT Filed: Mar. 8, 2021

(86) PCT No.: PCT/JP2021/009095
§ 371 (c)(1),
(2) Date: Oct. 21, 2022

(87) PCT Pub. No.: WO2021/220624
PCT Pub. Date: Nov. 4, 2021

(65) Prior Publication Data
US 2023/0093300 A1 Mar. 23, 2023

(30) Foreign Application Priority Data
Apr. 30, 2020 (JP) ................................. 2020-080858

(51) Int. Cl.
H04W 76/15 (2018.01)
H04B 7/06 (2006.01)

(52) U.S. Cl.
CPC .......... H04W 76/15 (2018.02); H04B 7/0626 (2013.01)

(58) Field of Classification Search
CPC ............. H04W 76/15; H04W 28/0958; H04W 72/542; H04W 76/40; H04W 84/12; H04W 24/08; H04B 7/0626
See application file for complete search history.

(56) References Cited

U.S. PATENT DOCUMENTS

2011/0075607 A1* 3/2011 Kim ..................... H04L 25/0204
370/328
2013/0182671 A1* 7/2013 Kakishima ........... H04B 7/0404
370/329
(Continued)

FOREIGN PATENT DOCUMENTS

JP 2018511222 A 4/2018
JP 2018-157535 A 10/2018

OTHER PUBLICATIONS

International Search Report and Written Opinion mailed on Jun. 1, 2021, received for PCT Application PCT/JP2021/009095, filed on Mar. 8, 2021, 9 pages including English Translation.
(Continued)

*Primary Examiner* — Sun Jong Kim
(74) *Attorney, Agent, or Firm* — XSENSUS LLP

(57) ABSTRACT

A communication device for observing a channel state in a plurality of links is provided.

A communication device that performs wireless communication using a plurality of links includes a first transmission unit that transmits a first signal including information regarding start of observation of a channel state in part of the plurality of links, and a second transmission unit that transmits a second signal inducing a signal including information regarding observation of a channel state in one or more links among the plurality of links. The first signal includes information regarding a link for performing the observation and information regarding a third signal for another communication device to observe a channel state.

19 Claims, 19 Drawing Sheets

AP MLD

Non-AP MLD1    Non-AP MLD2    Single RF
Non-AP MLD

(56)                    References Cited

U.S. PATENT DOCUMENTS

| | | |
|---|---|---|
| 2016/0330732 A1 | 11/2016 | Moon |
| 2018/0206284 A1* | 7/2018 | Zhou ..................... H04L 1/1887 |
| 2019/0215896 A1* | 7/2019 | Zhou ..................... H04L 1/1812 |
| 2019/0261369 A1* | 8/2019 | Verma ................... H04L 5/0048 |
| 2020/0112350 A1 | 4/2020 | Yang et al. |

OTHER PUBLICATIONS

Huang et al., "Multi-link Broadcast Addressed Frame Reception", IEEE 802.11-19/1542r0, Aug. 27, 2019, 8 pages.
Patil et al., "Multi-Link Operation: Design Discussion", IEEE 802.11-19/0823r0, May 2, 2019, 11 pages.
Aio et al., "Consideration of Multi-AP Sounding", IEEE 802.11-19/1134r0, Jul. 15, 2019, 13 pages.

* cited by examiner

*FIG. 3*

START

S1101 — RECEIVE Sounding Announcement ON Enabled Link

S1102 — CHANGE Enabled Link TO ANOTHER LINK

S1103 — RECEIVE Sounding Trigger ON CHANGED Enabled Link

S1104 — TRANSMIT Test SIGNAL ON BASIS OF INFORMATION OF Sounding Trigger

S1105 — CHANGE Enabled Link TO ORIGINAL LINK

S1106 — TRANSMIT Test SIGNAL ON BASIS OF INFORMATION OF Sounding Trigger

END

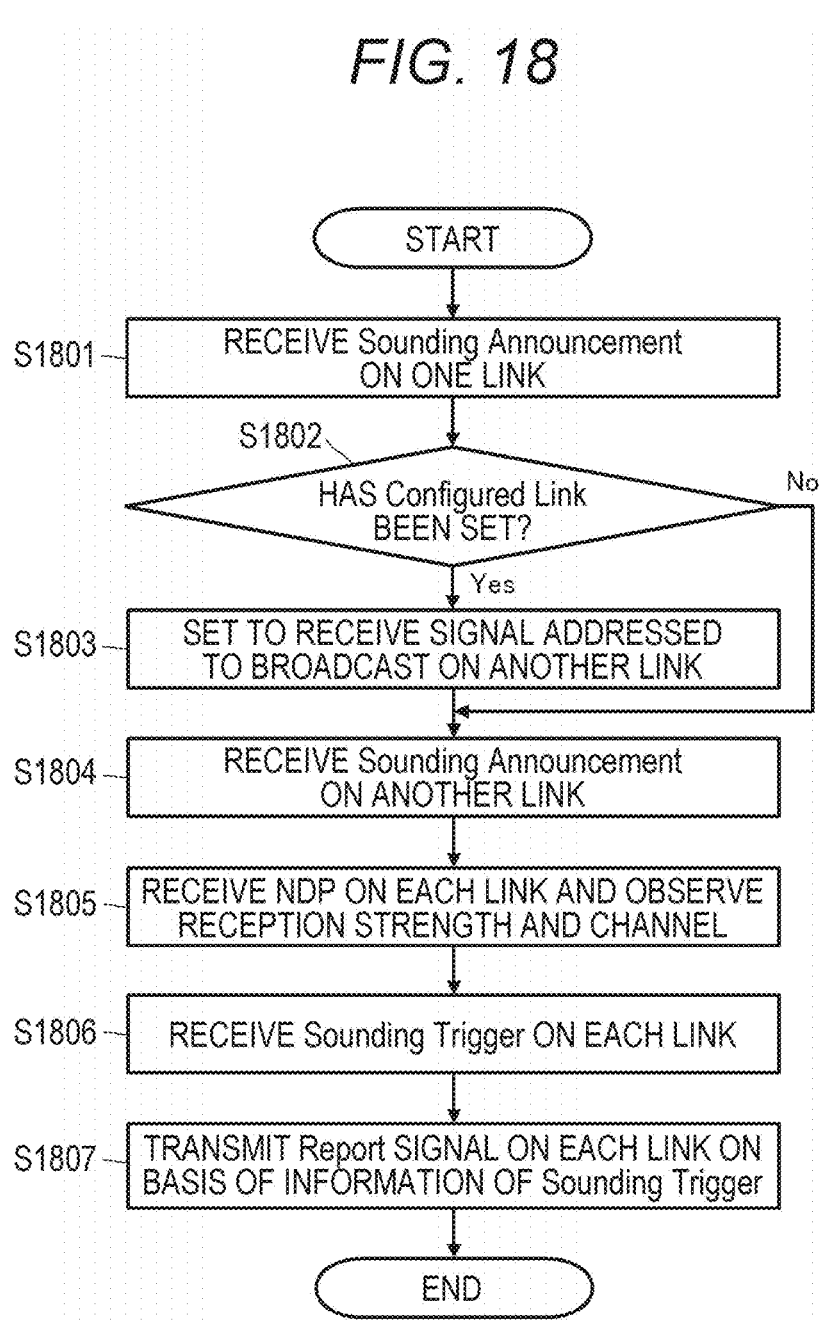

FIG. 18

START

S1801 — RECEIVE Sounding Announcement ON ONE LINK

S1802 — HAS Configured Link BEEN SET?

No

Yes

S1803 — SET TO RECEIVE SIGNAL ADDRESSED TO BROADCAST ON ANOTHER LINK

S1804 — RECEIVE Sounding Announcement ON ANOTHER LINK

S1805 — RECEIVE NDP ON EACH LINK AND OBSERVE RECEPTION STRENGTH AND CHANNEL

S1806 — RECEIVE Sounding Trigger ON EACH LINK

S1807 — TRANSMIT Report SIGNAL ON EACH LINK ON BASIS OF INFORMATION OF Sounding Trigger

END

COMMUNICATION DEVICE AND COMMUNICATION METHOD

CROSS-REFERENCE TO RELATED APPLICATIONS

The present application is based on PCT filing PCT/JP2021/009095, filed Mar. 8, 2021, which claims priority to JP 2020-080858, filed Apr. 30, 2020, the entire contents of each of which are incorporated herein by reference.

TECHNICAL FIELD

The technology disclosed in the present description (hereinafter, "the present disclosure") relates to a communication device and a communication method that perform multi-link operation.

BACKGROUND ART

In recent years, wireless communication (multi-link operation (MLO)) using a plurality of frequency bands (links) has been standardized as a method for coping with a high transmission speed requirement such as video transmission of XR or 8K. In MLO, it is assumed that a terminal (STAtion: STA) that supports MLO is connected to an access point (AP) that supports MLO by using a plurality of links. Furthermore, in wireless communication, uplink multi-user multiplexing (UL MU) and downlink multi-user multiplexing (DL MU) are generally performed in order to efficiently perform uplink and downlink communication between an AP and a plurality of STAs. That is, in MLO, it is assumed that the AP and the STAs connected by a plurality of links perform MU communication by the plurality of links.

In a case where STAs with good channel characteristics and STAs with poor channel characteristics are multiplexed in MU communication, a received signal strength indicator (RSSI) of the AP is rate-limited according to the STA with poor channel characteristics. Thus, in MLO, it is desirable to perform multiplexing resource allocation of UL and DL MU communication in consideration of the channel characteristics between the AP and the STAs in all the links observed in the state of having a high time correlation. However, in a case where observation is performed on a large number of links, there is a problem that the time correlation cannot be secured due to a difference in observation timing or the like.

For example, as a communication method assuming a wireless local area network (LAN) using a plurality of bands, a method of optimizing a signal to interference plus noise ratio (SINR) on a reception side in downlink (DL) Orthogonal Frequency Division Multiple Access (OFDMA) has been proposed (see Patent Document 1). However, even if this method is optimized for transmission in DL OFDMA, this method cannot be applied to UL MU communication by a plurality of other terminals.

Furthermore, a public contribution (19/1542r2) of IEEE 802.11 (Non Patent Document 1) describes a problem at the time when the terminal that supports MLO receives a broadcast signal and setting of a link (Configured Link) for performing reception processing of a broadcast signal. However, in a case where the AP performs the UL and DL MU communication with STAs connected by a plurality of links in MLO, it is necessary to consider both a case where the Configured Link is set and a case where the Configured Link is not set.

CITATION LIST

Patent Document

Patent Document 1: Japanese Patent Application Laid-Open No. 2018-157535

Non-Patent Document

Non-Patent Document 1: Public Contribution of IEEE 802.11 (19/1542r2)

SUMMARY OF THE INVENTION

Problems to be Solved by the Invention

An object of the present disclosure is to provide a communication device and a communication method for observing a channel state in a plurality of links.

Solutions to Problems

The present disclosure has been made in view of the above problems, and a first aspect thereof is a communication device that performs wireless communication using a plurality of links, the communication device including:

a first transmission unit that transmits a first signal including information regarding start of observation of a channel state in part of the plurality of links; and a second transmission unit that transmits a second signal inducing a signal including information regarding observation of a channel state in one or more links among the plurality of links.

The first signal includes information regarding a link for performing the observation and information regarding a third signal for another communication device to observe a channel state.

The second signal is a signal that induces a fourth signal for the communication device itself to observe a channel state. In this case, in the communication device according to the first aspect, resource allocation for multi-user communication is determined on the basis of information regarding the channel state observed by the communication device itself from the fourth signal transmitted from another communication device in response to the second signal.

Alternatively, the second signal is a signal that induces a fifth signal including information regarding a channel state observed by another communication device. In this case, in the communication device according to the first aspect, resource allocation of multi-user communication is determined on the basis of information regarding a channel state collected from the fifth signal transmitted by the another communication device in response to the second signal.

Furthermore, a second aspect of the present disclosure is a communication method for performing wireless communication using a plurality of links, the communication method including:

a first transmission step of transmitting a first signal including information regarding start of observation of a channel state in part of the plurality of links; and a second transmission step of transmitting a second signal inducing a signal including information regarding observation of a channel state in one or more links among the plurality of links.

Furthermore, a third aspect of the present disclosure is a communication device that performs wireless communication using a plurality of links, the communication device including transmitting a signal including information regarding observation of a channel state in one or more links among the plurality of links.

The signal including the information regarding observation of the channel state may be a fourth signal for another communication device to observe the channel state or a fifth signal including information regarding the channel state observed by the communication device itself, and may include information of transmission power of the signal.

Furthermore, a fourth aspect of the present disclosure is a communication method for performing wireless communication using a plurality of links, the communication method including transmitting a signal including information regarding observation of a channel state in one or more links among the plurality of links.

EFFECTS OF THE INVENTION

According to the present disclosure, it is possible to provide a communication device and a communication method that perform channel state observation for acquiring channel characteristics with a high time correlation in a plurality of links.

Note that the effects described in the present disclosure are merely examples, and the effects brought by the technology disclosed herein are not limited thereto. Furthermore, in addition to the above-described effects, the present disclosure may further exhibit additional effects.

Other objects, features, and advantages of the present disclosure will become apparent from a more detailed description based on embodiments described below and the accompanying drawings.

BRIEF DESCRIPTION OF DRAWINGS

FIG. 3 is a diagram illustrating a communication sequence example (case (1)) for performing sounding of uplink.

FIG. 18 is a flowchart illustrating a processing procedure executed by the Non-AP MLD in a case where the sounding of the downlink is performed.

MODE FOR CARRYING OUT THE INVENTION

Hereinafter, the technology according to the present disclosure will be described in the following order with reference to the drawings.

A. Overview
B. System Configuration
C. Device Configuration
D. Example Related to Sounding
D-1. Sounding of Up-ring
D-2. Frame Format of Signal Used for Sounding
D-3. Operation of Communication Device During Sounding of Uplink
D-4. Sounding of Down-ring
D-5. Frame Format of Signal Used for Sounding of Downlink
D-6. Series of Communication Sequences of Sounding of Downlink
D-7. Operation of Communication Device During Sounding of Downlink A. Overview The present disclosure provides a channel state observation method for obtaining a channel characteristic with a high time correlation in a plurality of links. In the present disclosure, the channel state of each link can be observed with a high time correlation by making a transmission timing of a Test signal (UL Sounding) or a Null Data Packet (NDP) signal (DL Sounding) for observing the channel state, that is, sounding close to each other. Further, the present disclosure also provides a sounding method in a case where a STA that supports MLO having a single radio frequency (RF) block is connected to an AP that supports MLO. Furthermore, the present disclosure also provides a sounding method in a case where MLO is set (Configured Link) to perform reception processing of a signal addressed to broadcast only on a specific link.

According to the present disclosure, it is possible to collect information necessary for setting resource parameters when UL and DL MU communication is performed in a plurality of links while securing a high time correlation. Further, according to the present disclosure, it is possible to set resources in the UL and DL MU communication in consideration of channel characteristics of all links and to improve spectrum efficiency. Furthermore, according to the present disclosure, it is possible to reduce reception results for each STA and each link managed by the AP and suppress a memory request. Further, according to the present disclosure, it is possible to suppress an increase in the number of links allocated to STAs and to reduce the number of requests of RF chains of APs that perform the UL and DL MU communication.

B. System Configuration

Figure 1:
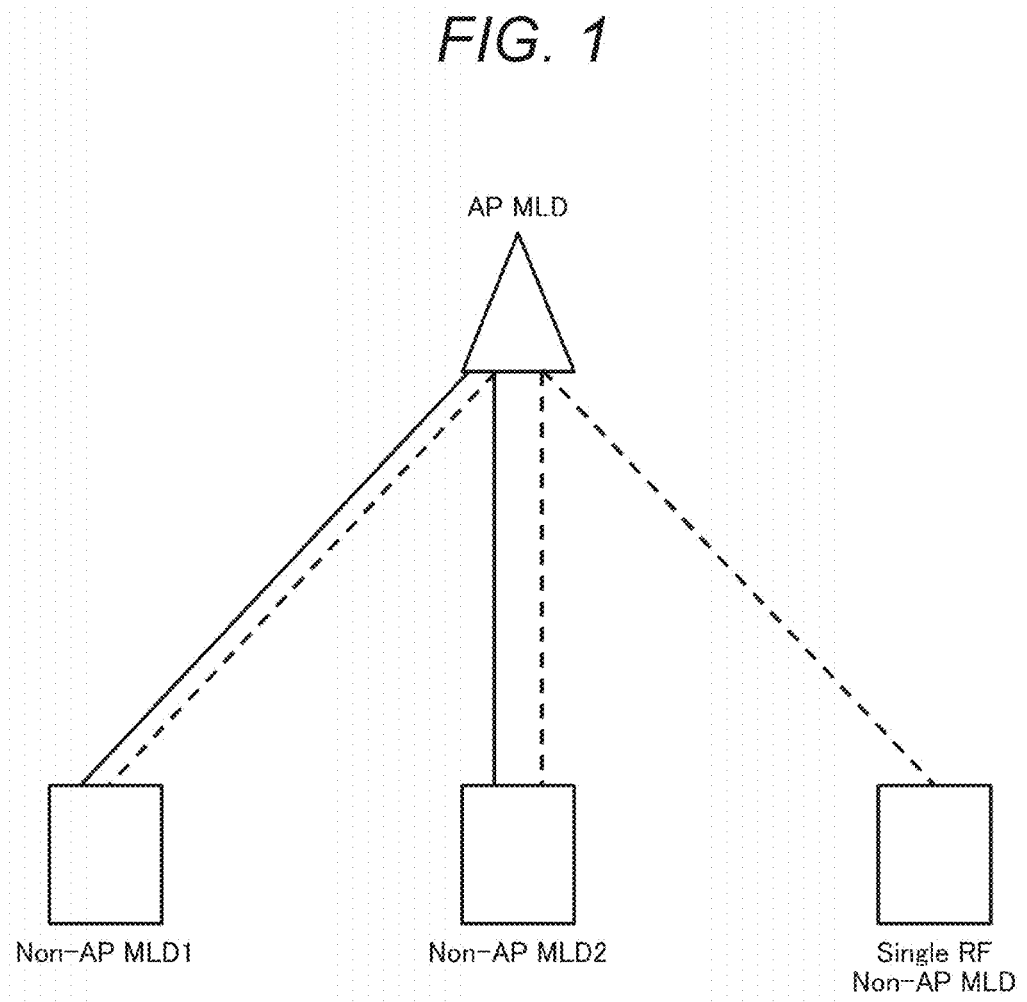
FIG. 1 is a diagram illustrating a configuration example of a communication system.

FIG. 1 schematically illustrates a configuration example of a communication system that supports MLO to which the present disclosure is applied. The illustrated communication system includes an AP Multi Link Device (MLD), a Non-AP MLD1 and a Non-AP MLD2, and a Single RF Non-AP MLD.

The AP MLD is a communication device corresponding to a base station that supports MLO. The Non-AP MLD is a communication device corresponding to a terminal that supports MLO. The Non-AP MLD performs reception processing of a broadcast signal by the Configured Link. The Configured Link can be switched. The Single RF Non-AP MLD is a wireless device that is equipped with a Single RF block (antenna, radio interface, and the like) and correspond to a terminal that supports MLO that performs communication on a single link. A link on which the Single RF Non-AP MLD enables transmission and reception is an Enabled Link. The Enabled Link can be switched.

The Non-AP MLD1, the Non-AP MLD2, and the Single RF Non-AP MLD are connected to the AP MLD. Furthermore, in FIG. 1, a solid line and a broken line connecting between each of the Non-AP MLD1 and Non-AP MLD2 and the Single RF Non-AP MLD and the AP MLD indicate that each of them is connected by a different link.

Note that the "link" referred to in the present description is a wireless transmission path through which data can be transmitted between two communication devices. The individual links are selected from, for example, a plurality of wireless transmission paths (channels) divided in a frequency domain and independent from each other. The two links used in the communication system illustrated in FIG. 1 use channels selected from a plurality of channels included in any band of frequency bands such as 2.4 GHz band, 5 GHz band, 6 GHz band, and 920 GHz band, for example. The two links used in the communications system illustrated in FIG. 1 may be two channels selected from the same frequency band or two channels selected from different frequency bands. Furthermore, a frequency band including a channel selected by at least one of two links used in the communication system illustrated in FIG. 1 may be a frequency band permitted to be used by database access such as a spectrum access system (SAS).

C. Device Configuration

Figure 2:
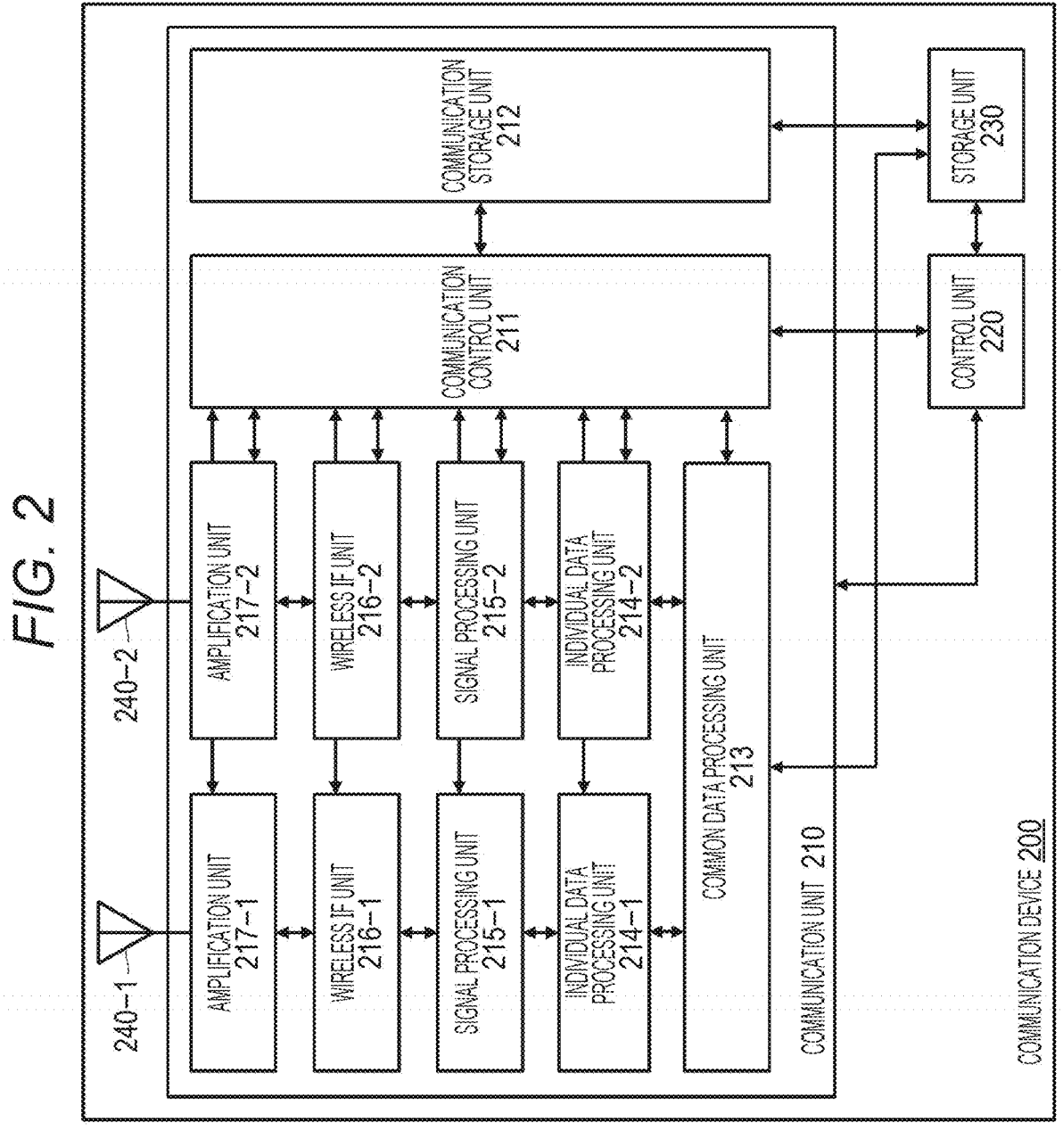
FIG. 2 is a diagram illustrating an internal configuration example of a communication device 200.

FIG. 2 illustrates an internal configuration example of the communication device 200. The communication device 200 is a communication device that supports MLO, and is assumed to operate as the AP MLD or Non-AP MLD in the communication system illustrated in FIG. 1. The communication device 200 mainly includes a communication unit 210, a control unit 220, a storage unit 230, and an antenna 240. Furthermore, the communication unit 210 includes a communication control unit 211, a communication storage unit 212, a data processing unit including a common data processing unit 213 and an individual data processing unit 214, a signal processing unit 215, a wireless interface (IF) unit 216, and an amplification unit 217.

The individual data processing unit 214, the signal processing unit 215, the wireless interface (IF) unit 216, the amplification unit 217, and the antenna 240 are provided for each link. It is assumed that the communication device 200 performs MLO by using two links of a first link and a second link. For example, an individual data processing unit 214-1, a signal processing unit 215-1, a wireless interface unit 216-1, an amplification unit 217-1, and an antenna 240-1 are assumed as one set for transmission-reception processing on the first link, and an individual data processing unit 214-2, a signal processing unit 215-2, a wireless interface unit 216-2, an amplification unit 217-2, and an antenna 240-2 are assumed as another set for transmission-reception processing on the second link.

The communication control unit 211 controls operation of each unit in the communication unit 210 and information transmission between the units. Furthermore, the communication control unit 211 performs control to transfer control information and management information to be notified to another communication device to a data processing unit (common data processing unit 213, individual data processing unit 214-1, and individual data processing unit 214-2).

In the present disclosure, the communication control unit 211 controls operation of each unit in the communication unit 210 so as to transmit a signal related to sounding in a plurality of links. Furthermore, the communication control unit 211 performs control to set resources for UL MU communication or DL MU communication in a plurality of links on the basis of a sounding result.

The communication storage unit 212 holds information used by the communication control unit 211. Furthermore, the communication storage unit 212 holds data transmitted by the communication device 200 and data received by the communication device 200.

The data processing unit includes the common data processing unit 213 and the individual data processing unit 214. Furthermore, the individual data processing unit 214 includes the individual data processing unit 214-1 and the individual data processing unit 214-2 for each link.

At the time of transmission, the common data processing unit 213 performs sequence management of the data held in the communication storage unit 212 and the control information and the management information received from the communication control unit 211, performs encryption processing or the like to generate a data unit, and performs allocation to the individual data processing units 214-1 and 214-2. Furthermore, at the time of reception, the common data processing unit 213 performs decryption processing and reorder processing of the data unit.

At the time of transmission, the individual data processing units 214-1 and 214-2 perform a channel access operation based on carrier sensing in a corresponding link, addition of a media access control (MAC) header and addition of an error detection code to data to be transmitted, and multiple concatenation processing of data units. Furthermore, at the time of reception, the individual data processing units 214-1 and 214-2 perform decoupling processing of the MAC header, analysis and error detection, and a retransmission request operation of the received data unit.

Note that operations of the common data processing unit 213 and the individual data processing units 214-1 and 214-2 are not limited to the above, and for example, one may perform the other operation.

At the time of transmission, the signal processing units 215-1 and 215-1-2 perform encoding, interleaving, modulation, and the like on the data unit, and add a physical header, and generate a symbol stream. Further, at the time of reception, the signal processing units 215-1 and 215-2 analyze the physical header, perform demodulation, deinterleaving, decoding, and the like on the symbol stream, and generate a data unit. Furthermore, the signal processing units 215-1 and 215-2 perform complex channel characteristic estimation and spatial separation processing as necessary.

At the time of transmission, the wireless interface units 216-1 and 216-2 perform digital-analog signal conversion, filtering, up-conversion, and phase control on the symbol stream, and generate a transmission signal. Furthermore, at the time of reception, the wireless interface units 216-1 and 216-2 perform down-conversion, filtering, and analog-digital signal conversion on the received signal, and generate a symbol stream.

The amplification units 217-1 and 217-2 amplify the signals input from the wireless interface units 216-1 and 216-2 at the time of transmission. Furthermore, the amplification units 217-1 and 217-2 amplify signals input from the antennas 240-1 and 240-2 at the time of reception. Part of the amplification units 217-1 and 217-2 may be a component outside the communication unit 210. Furthermore, part of the amplification units 217-1 and 217-2 may be included in the wireless interface units 216-1 and 216-2.

The control unit 220 controls the communication unit 210 and the communication control unit 211. Further, the control unit 220 may perform part of the operation of the communication control unit 211 instead. Furthermore, the communication control unit 211 and the control unit 220 may be configured as one block.

The storage unit 230 holds information used by the communication unit 210 and the control unit 220. Furthermore, the storage unit 230 may perform part of the operation of the communication storage unit 212 instead. Furthermore, the storage unit 230 and the communication storage unit 212 may be configured as one block.

The individual data processing unit 214-1, the signal processing unit 215-1, the wireless interface unit 216-1, the amplification unit 217-1, and the antenna 240-1 are assumed as one set, and wireless communication is performed on the first link. Furthermore, the individual data processing unit 214-2, the signal processing unit 215-2, the wireless interface unit 216-2, the amplification unit 217-2, and the antenna 240-2 are assumed as another set, and wireless communication is performed on the second link. Although only two sets are illustrated in FIG. 2, it can be configured such that three or more sets are components of the communication device 200, and each set performs wireless communication on a respective link. Furthermore, the storage unit 230 or the communication storage unit 212 may be included in each set.

The link is a wireless transmission path through which data can be transmitted between two communication devices, and each link is selected from, for example, a plurality of wireless transmission paths (channels) divided in a frequency domain and independent from each other. The links used by the respective sets described above may be two channels selected from the same frequency band or two channels selected from different frequency bands. Furthermore, the individual data processing unit 214 and the signal processing unit 215 may be configured as one set, and two or more sets may be connected to one wireless interface unit 216.

The wireless interface unit 216, the amplification unit 217, and the antenna 240 may be assumed as one set, and two or more sets may be components of the communication device 200.

The communication unit 210 can also be configured by one or more large scale integrations (LSIs).

The common data processing unit 213 is also referred to as Upper MAC or Higher MAC, and the individual data processing unit 214 is also referred to as Lower MAC.

Furthermore, a set of the individual data processing unit 214 and the signal processing unit 215 is also referred to as AP entity or Non-AP entity. Furthermore, the communication control unit 211 is also referred to as MLD management entity.

D. Example Related to Sounding

In this section, examples related to a sounding method in a communication system to which the present disclosure is applied will be described separately for sounding of uplink and sounding of downlink. In each of the examples, the following cases (1) to (3) are described.

(1) Case where Non-AP MLD is connected to AP MLD
(2) Case where Non-AP MLD and Single RF Non-AP MLD are connected to AP MLD
(3) Case where Configured Link is set In the example related to the sounding of both uplink and downlink, an example in which the AP MLD, the Non-AP MLD, and the Single RF Non-AP MLD perform communication using the first link (Link1) and the second link (Link2) will be described. At least one of the two link frequency bands may be a frequency band permitted to be used by database access such as SAS.

D-1. Sounding of Uplink

First, an example related to the sounding of the uplink will be described separately for the above described cases (1) to (3).

Figure 3:
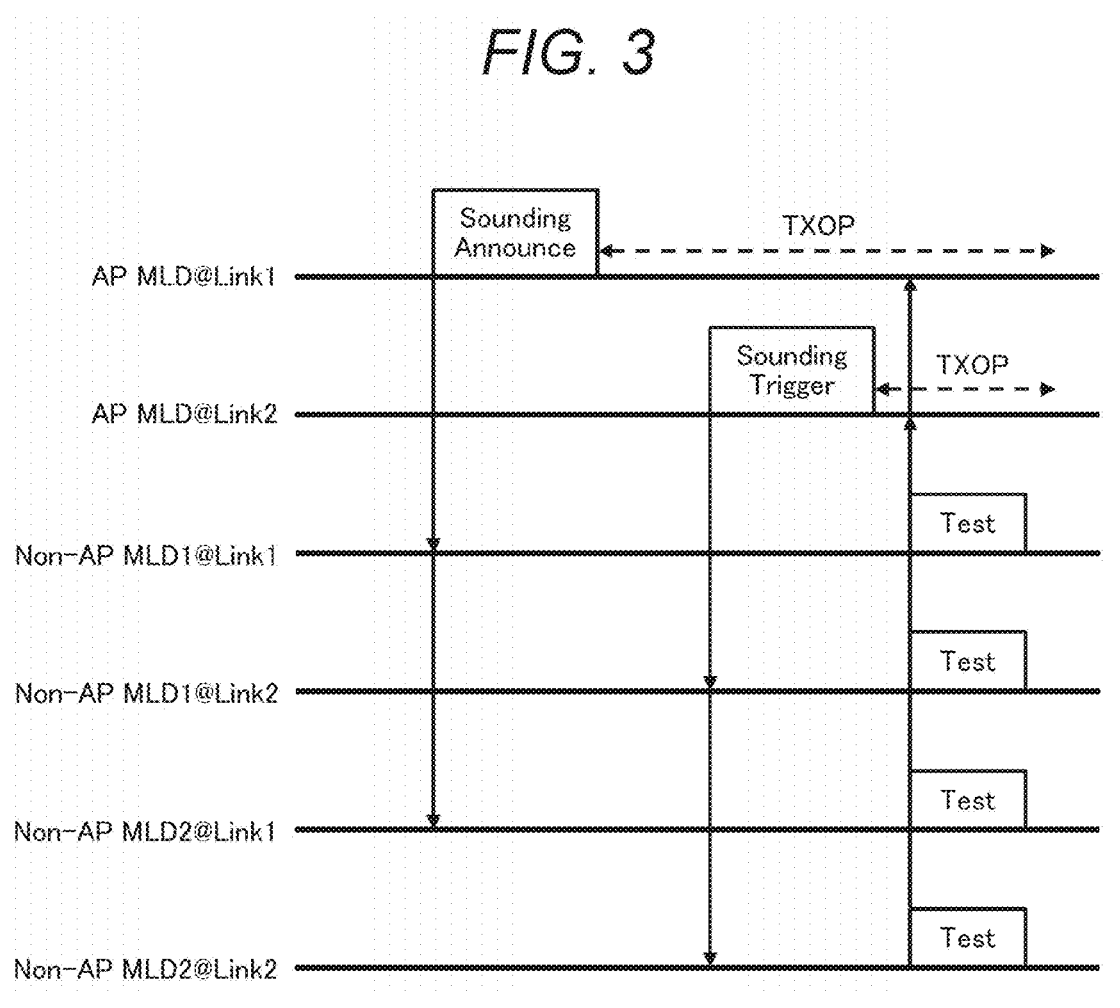

FIG. 3 illustrates a communication sequence example in which the sounding of the uplink is performed in the case (1) where the Non-AP MLD is connected to the AP MLD. Here, the communication system illustrated in FIG. 1 is assumed, and the Non-AP MLD1 and the Non-AP MLD2 that support MLO are both connected to the AP MLD by the Link1 and the Link2.

Note that a horizontal axis in FIG. 3 is a time axis, and indicates a communication operation on each link of the AP MLD, the Non-AP MLD1, and the Non-AP MLD2 at every time. A square block drawn by a solid line indicates a transmission frame at a corresponding communication device, link, and time, and an arrow of a solid line in the vertical direction indicates frame transmission to a destination.

Before starting this communication sequence, it is confirmed that the AP MLD and the Non-AP MLD1 and Non-AP MLD2 support MLO and support the sounding method illustrated in FIG. 3.

Upon acquiring the transmission right on the Link1, the AP MLD transmits a Sounding Announcement signal including information regarding starting of the sounding of the uplink on the Link1.

Note that, although not illustrated in FIG. 3, the AP MLD may transmit a signal for acquiring the transmission right before the Sounding Announcement signal. This signal may be a Request To Send (RTS) frame or a Clear To Send (CTS) frame defined in IEEE 802.11. The CTS frame may be a CTS-to-self frame transmitted to itself. With the signal for acquiring the transmission right, surrounding communication terminals suppress communication.

The AP MLD transmits the Sounding Announcement signal to a broadcast address. The Sounding Announcement signal used in the sounding of up-ring may include information regarding an identifier of sounding, information regarding a transmission link of a subsequent Sounding Trigger signal or a Sounding Announcement signal transmitted by the AP MLD, information regarding a timeout time during which the AP MLD waits for acquisition of the transmission right on another link and stops the sounding in a case where the timeout time is exceeded, information regarding an identifier of the Non-AP MLD to be a sounding target, and information regarding resource allocation of a Test signal transmitted by the Non-AP MLD to be the sounding target on a link on which the Sounding Announcement signal is transmitted. Details of the Sounding Announcement signal used in the sounding of up-ring will be described later.

Upon receiving the Sounding Announcement signal from the AP MLD on the Link1, the Non-AP MLD1 and the Non-AP MLD2 suppress the transmission other than the sounding.

Next, the AP MLD acquires the transmission right on the Link2, and transmits, on the Link2, the Sounding Trigger signal that induces transmission of the Test signal for sounding. Note that, although not illustrated in FIG. 3, the AP MLD may transmit the signal for acquiring the transmission right (described above) before the Sounding Trigger signal.

The AP MLD transmits the Sounding Trigger signal to the broadcast address. The Sounding Trigger signal may include information regarding an identifier of sounding, information regarding a request for transmission of the Test signal by the Non-AP MLD to be a sounding target on a link other than the link on which the Sounding Trigger signal is transmitted, information regarding an identifier of the Non-AP MLD to be the sounding target, and information regarding resource allocation of the Test signal transmitted by the Non-AP MLD to be the sounding target. Details of the Sounding Trigger signal will be described later.

Note that, in a case where there are three or more links that can be used for MLO in the assumed communication system, the AP MLD may transmit the Sounding Announcement signal in a plurality of links, and may transmit the Sounding Trigger signal on the last link.

Furthermore, in a case where the AP MLD can acquire the transmission right simultaneously in a plurality of links, the AP MLD may simultaneously transmit one or more Sounding Announcement signals and NDP Announcement signals in respective links. The NDP Announcement signal is a signal including information regarding start of the sounding of the downlink, and notifies that the AP MLD transmits an NDP signal for channel state observation.

Upon receiving the Sounding Trigger signal from the AP MLD on the Link2, the Non-AP MLD1 and the Non-AP MLD2 transmit Test signals on the Link1 and the Link2, respectively, at the same timing on the basis of the information of the Sounding Announcement signal and the Sounding Trigger signal. The Non-AP MLD1 and the Non-AP MLD2 may transmit the Test signal after a fixed time from completion of reception of the Sounding Trigger signal, or after a Short Inter Frame Space (SIFS) interval defined in IEEE 802.11. Furthermore, the Non-AP MLD1 and the Non-AP MLD2 may include information regarding transmission power in the Test signal. Details of the Test signal will be described later.

Upon receiving the Test signals simultaneously transmitted from the Non-AP MLD1 and the Non-AP MLD2, the AP MLD calculates the information regarding a propagation loss of the uplink with each of the Non-AP MLD1 and the Non-AP MLD2 from received signal strength and the information regarding the transmission power. Note that, before starting this communication sequence, the AP MLD and the Non-AP MLD1 and Non-AP MLD2 may perform calibration for correcting transmission and reception circuit errors and the like of both. The AP MLD may calculate weight information used when DL MU Multiple Input Multiple Output (MU-MIMO) is performed from information of the calibration and information of the Test signal.

Thereafter, the AP MLD decides resource allocation for the UL MU communication on the basis of the calculated information regarding the propagation loss of the uplink with each of the Non-AP MLD1 and the Non-AP MLD2.

By the communication sequence illustrated in FIG. 3, the AP MLD can collect propagation losses in bands of a plurality of links while maintaining a time correlation. Furthermore, the AP MLD can allocate resources for the UL MU communication in consideration of propagation losses of all links.

Figure 4:
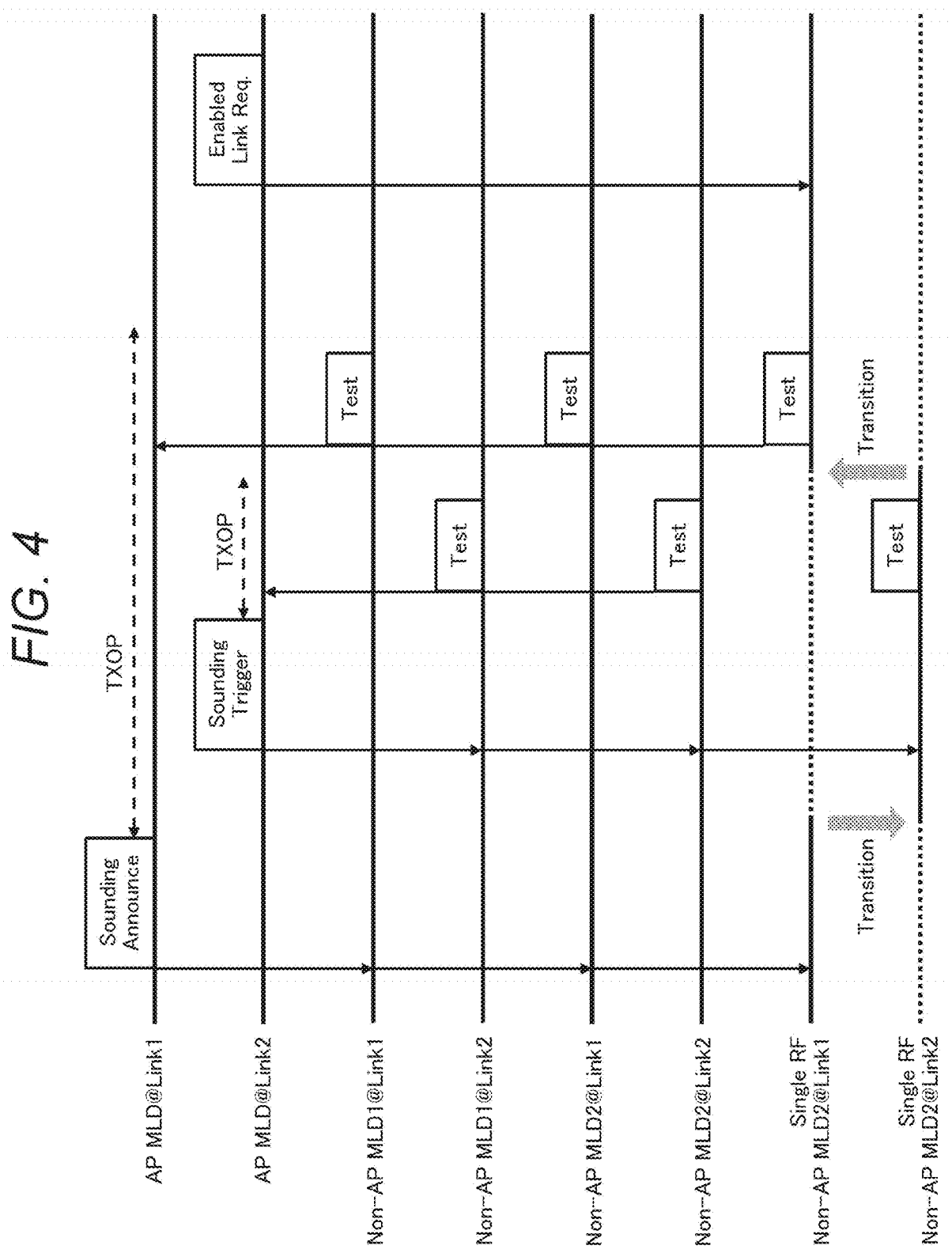
FIG. 4 is a diagram illustrating a communication sequence example (case (2)) for performing the sounding of the uplink.

FIG. 4 illustrates a communication sequence example in which the sounding of the uplink is performed in the case (2) where the Non-AP MLD and the Single RF Non-AP MLD are connected to the AP MLD. Here, the communication system illustrated in FIG. 1 is assumed, and the Non-AP MLD1 and the Non-AP MLD2 that support MLO are both connected to the AP MLD by the Link1 and the Link2. Furthermore, the Single RF Non-AP MLD is connected to the AP MLD by switching the Enabled Link on which signal transmission and reception are enabled between the Link1 and the Link2 as needed.

Note that a horizontal axis in FIG. 4 is a time axis, and indicates a communication operation on each link of the AP MLD, the Non-AP MLD1 and Non-AP MLD2, and the Single RF Non-AP MLD at every time. A square block drawn by a solid line indicates a transmission frame at a corresponding communication device, link, and time, and an arrow of a solid line in the vertical direction indicates frame transmission to a destination.

Before starting this communication sequence, it is confirmed that the AP MLD, the Non-AP MLD1 and Non-AP MLD2, and the Single RF Non-AP MLD support MLO and support the sounding method illustrated in FIG. 4. Furthermore, before the start of this communication sequence, the AP MLD and the Single RF Non-AP MLD share information regarding Enabled Link, which is a link on which the Single RF Non-AP MLD enables signal transmission and reception. In this communication sequence, it is assumed that the Single RF Non-AP MLD has set the Link1 to the Enabled Link.

Upon acquiring the transmission right on the Link1, the AP MLD transmits the Sounding Announcement signal including information regarding the start of sounding on the Link1.

Upon receiving the Sounding Announcement signal from the AP MLD on the Link1, the Non-AP MLD1 and the Non-AP MLD2 suppress the transmission other than the sounding. Furthermore, upon receiving a Sounding Announcement signal from the AP MLD on the Link1 set to Enabled Link, the Single RF Non-AP MLD suppresses communication other than this sounding with respect to the Single RF Non-AP MLD itself, and changes Enabled Link on the basis of information regarding a transmission link of the subsequent Sounding Trigger signal or Sounding Announcement signal transmitted by the AP MLD, which is notified by the Sounding Announcement signal. In this communication sequence example, the Single RF Non-AP MLD changes the Enabled Link from the Link1 to the Link2.

Next, the AP MLD acquires the transmission right on the Link2, and transmits, on the Link2, the Sounding Trigger signal that induces transmission of the Test signal for sounding.

Upon receiving the Sounding Trigger signal from the AP MLD at the Link2, the Non-AP MLD1 and Non-AP MLD2 and the Single RF Non-AP MLD transmit Test signals at the same timing at the Link2 on the basis of the information of the Sounding Announcement signal and the Sounding Trigger signal.

Furthermore, the Single RF Non-AP MLD changes the Enabled Link after transmitting a Test signal on the Link2. In this communication sequence example, the Single RF Non-AP MLD changes the Enabled Link from the Link2 to the Link1.

Thereafter, the Non-AP MLD1 and Non-AP MLD2 and the Single RF Non-AP MLD transmit the Test signal at the same timing on the Link1 on the basis of the information of the Sounding Announcement signal and the Sounding Trigger signal.

Note that, before the Test signal is transmitted on the Link1, the AP MLD may transmit the Sounding Trigger signal again to induce the Test signal to be transmitted. Furthermore, the AP MLD may transmit the Sounding Announcement signal also on the Link2, and then the Non-AP MLD1 and Non-AP MLD2 and the Single RF Non-AP MLD may transmit a Test signal on the Link1.

Upon receiving the Test signals simultaneously transmitted from the Non-AP MLD1 and Non-AP MLD2 and the Single RF Non-AP MLD on the Link1 and the Link2, respectively, the AP MLD calculates the information regarding the propagation loss of the uplink with each of the Non-AP MLD1 and Non-AP MLD2 and the Single RF Non-AP MLD from received signal strength and the information regarding the transmission power. Note that, before starting this communication sequence, the AP MLD, the Non-AP MLD1 and Non-AP MLD2, and the Single RF Non-AP MLD may perform calibration for correcting transmission and reception circuit errors and the like of both. The AP MLD may calculate the weight information used when the DL MU-MIMO is performed from the information of the calibration and the information of the Test signal.

Thereafter, the AP MLD decides resource allocation for the UL MU communication on the basis of the calculated information regarding the propagation loss of the uplink with each of the Non-AP MLD1 and Non-AP MLD2 and the Single RF Non-AP MLD. Note that, in a case where it is necessary to change the Enabled Link of the Single RF Non-AP MLD during the determination, the AP MLD may transmit a signal (Enabled Link request) requesting the Single RF Non-AP MLD to change the Enabled Link. This signal includes information of the Enabled Link after the change, but may further include information regarding a reason of the change request. For example, in a case where it is found that the channel state between the AP and the Single RF Non-AP MLD is better at the Link2 than the Link1 as a result of observing the channel state, the AP MLD transmits, to the Single RF Non-AP MLD, a signal for requesting the Single RF Non-AP MLD to switch the Enabled Link to the Link2.

By the communication sequence illustrated in FIG. 4, even in the case (2) where the Non-AP MLD and the Single RF Non-AP MLD are connected to the AP MLD, the AP MLD can collect propagation losses in bands of a plurality of links while maintaining a time correlation. Furthermore, the AP MLD can allocate resources for the UL MU communication in consideration of propagation losses of all links.

Figure 5:
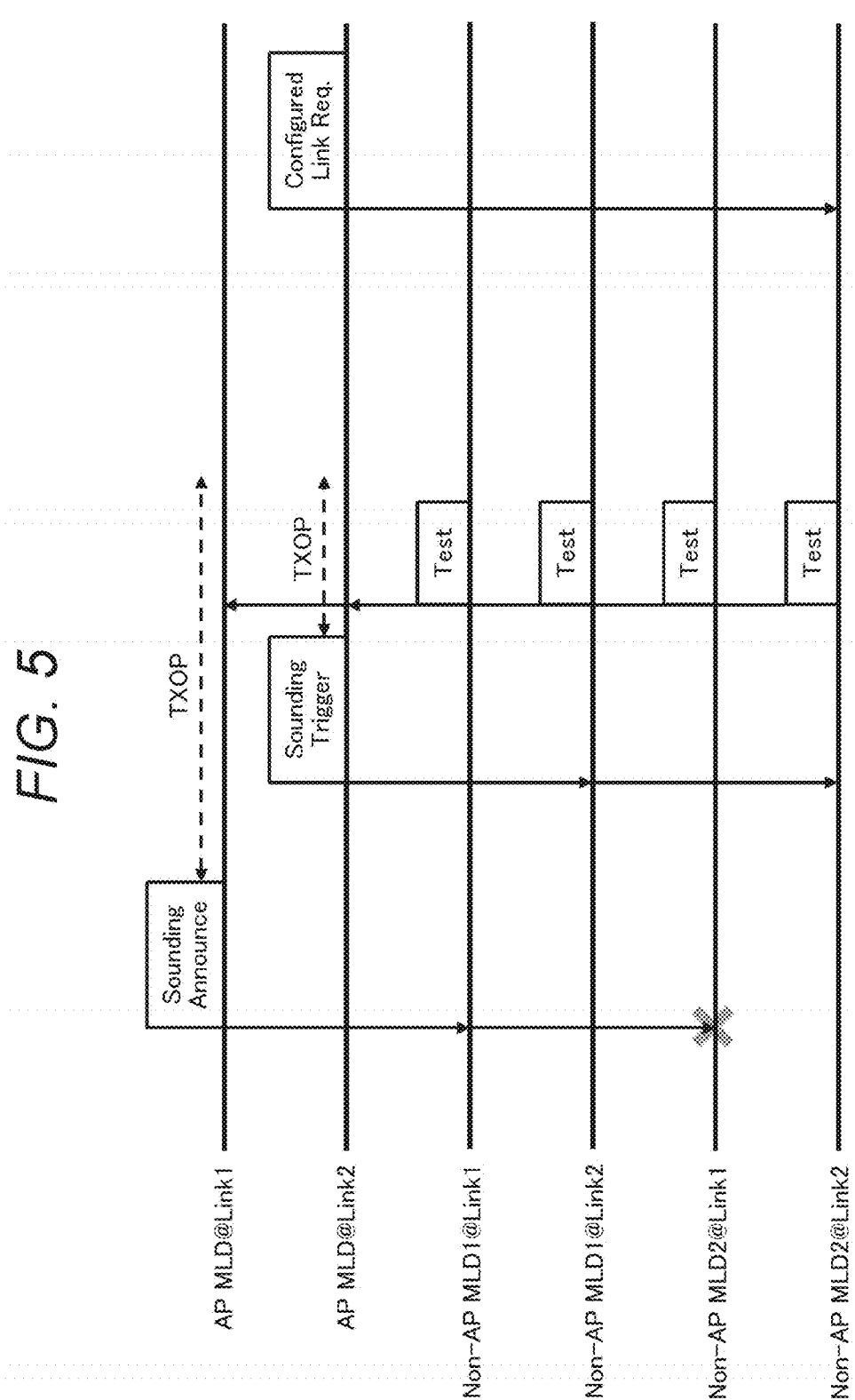
FIG. 5 is a diagram illustrating a communication sequence example (case (3)) for performing the sounding of the uplink.

FIG. 5 illustrates a communication sequence example in which the sounding of the uplink is performed in the case (3) where the Configured Link is configured. Here, the communication system illustrated in FIG. 1 is assumed, and the Non-AP MLD1 and the Non-AP MLD2 that support MLO are both connected to the AP MLD by the Link1 and the Link2.

Note that a horizontal axis in FIG. 5 is a time axis, and indicates a communication operation on each link of the AP MLD, the Non-AP MLD1, and the Non-AP MLD2 at every time. A square block drawn by a solid line indicates a transmission frame at a corresponding communication device, link, and time, and an arrow of a solid line in the vertical direction indicates frame transmission to a destination.

Before starting this communication sequence, it is confirmed that the AP MLD and the Non-AP MLD1 and Non-AP MLD2 support MLO and support the sounding method illustrated in FIG. 5. Furthermore, before the start of this communication sequence, the AP MLD and the Non-AP MLD1 and Non-AP MLD2 confirm information regarding the Configured Link which is a link for reception processing of the signal addressed to broadcast. In the communication sequence example illustrated in FIG. 5, it is assumed that the Non-AP MLD1 has set the Link1 to the Configured Link and the Non-AP MLD2 has set the Link2 to the Configured Link.

Upon acquiring the transmission right on the Link1, the AP MLD transmits the Sounding Announcement signal including information regarding the start of sounding on the Link1.

The Non-AP MLD1 that has set the Link1 to the Configured Link performs reception processing of the Sounding Announcement signal, and performs setting to perform reception processing of the signal addressed to broadcast on the Link2, which is not the Configured Link, on the basis of the information regarding the transmission link of the subsequent Sounding Trigger signal or the Sounding Announcement signal transmitted by the AP MLD notified by the signal.

Furthermore, the Non-AP MLD2 that has set the Link2 to the Configured Link may perform the reception processing of the Sounding Announcement signal, and may stop the signal reception processing at the stage of confirming that the destination address of the signal is the broadcast address.

Next, the AP MLD acquires the transmission right on the Link2, and transmits, on the Link2, the Sounding Trigger signal that induces transmission of the Test signal for sounding.

Note that, in a case where there are three or more links that can be used for MLO in the assumed communication system, the AP MLD may transmit the Sounding Announcement signal in a plurality of links, and may transmit the Sounding Trigger signal on the last link.

Upon receiving the Sounding Trigger signal from the AP MLD on the Link2, the Non-AP MLD1 and the Non-AP MLD2 transmit Test signals on the Link1 and the Link2, respectively, at the same timing on the basis of the information of the Sounding Announcement signal and the Sounding Trigger signal.

Upon receiving the Test signals simultaneously transmitted from the Non-AP MLD1 and the Non-AP MLD2, the AP MLD calculates the information regarding a propagation loss of the uplink with each of the Non-AP MLD1 and the Non-AP MLD2 from received signal strength and the information regarding the transmission power.

Thereafter, the AP MLD decides resource allocation for the UL MU communication on the basis of the calculated information regarding the propagation loss of the uplink with each of the Non-AP MLD1 and the Non-AP MLD2. Note that, in a case where it is necessary to change the Configured Link set by the Non-AP MLD1 or the Non-AP MLD2 at the time of this determination, the AP MLD may send a signal requesting the Non-AP MLD1 or the Non-AP MLD2 to change the Configured Link. This signal includes information of the Configured Link after the change, but may further include information regarding a reason of the change request. For example, in a case where it is found that the channel state between the AP and the Non-AP MLD2 is better at the Link1 than the Link2 as a result of observing the channel state, the AP MLD transmits, to the Non-AP MLD2, a signal requesting the Non-AP MLD2 to switch the Configured Link to the Link1.

Note that, before starting this communication sequence, the AP MLD and the Non-AP MLD1 and Non-AP MLD2 may perform calibration for correcting transmission and reception circuit errors and the like of both. The AP MLD may calculate the weight information used when the DL MU-MIMO is performed from the information of the calibration and the information of the Test signal.

By the communication sequence illustrated in FIG. 5, the AP MLD can collect propagation losses in bands of a plurality of links while maintaining a time correlation. Furthermore, the AP MLD can allocate resources for the UL MU communication in consideration of propagation losses of all links.

D-2. Frame Format of Signal Used for Sounding

In this section, a frame format of each signal used in a communication sequence for sounding will be described.

Figure 6:
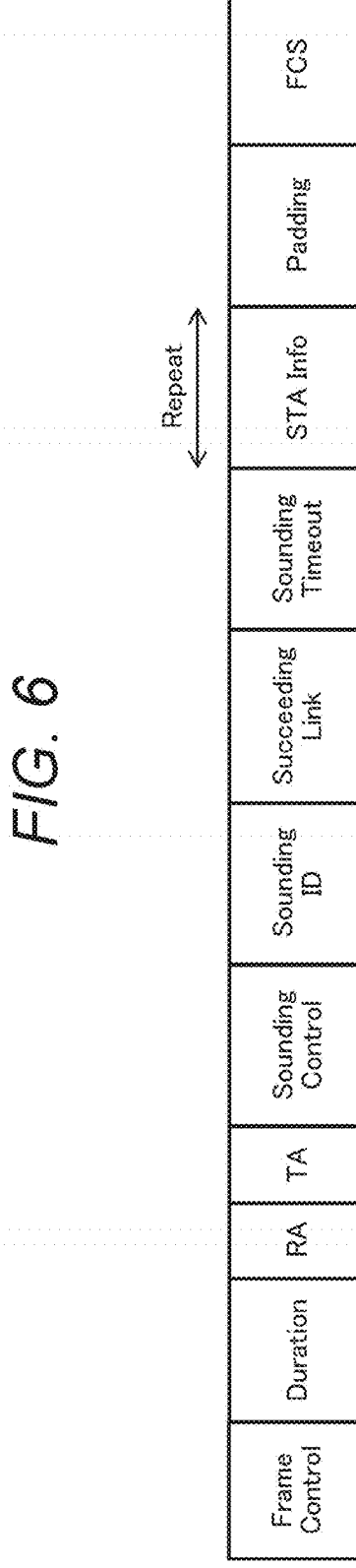
FIG. 6 is a diagram illustrating an example of a frame format of a Sounding Announcement signal.

FIG. 6 illustrates an example of a frame format of the Sounding Announcement signal. Each field of the illustrated frame will be described below.

A Frame Control field includes information regarding setting of the Sounding Announcement signal.

A Duration field includes information regarding the length of this frame.

A Received Address (RA) field includes information regarding the address of the destination terminal of this frame. The address may be the broadcast address.

A Transmitting Address (TA) field includes information regarding the address of the transmission source terminal of this frame. This address may be an address of the AP entity, or may be an address of the MLD management entity.

A Sounding Control field includes information regarding a notification that sounding according to the present disclosure is performed. This information may be included in the Frame Control field. This information may include information indicating that a period from after the transmission of the Sounding Announcement signal to the transmission of the Test signal is not a fixed time interval, information indicating that the period is not an SIFS interval, or information indicating that the period is Delayed sounding.

A Sounding ID field includes information regarding a sounding identifier.

A Succeeding Link field includes information regarding a transmission link of the subsequent Sounding Trigger signal or Sounding Announcement signal transmitted by the AP MLD as a transmission source of this signal, in other words, information regarding a link for observing a channel state. Further, this information may be indicated as information of a link (Enabled Link) enabled by Single RF Non-AP MLD in a case where the Single RF Non-AP MLD is connected to the AP MLD that is a transmission source of this signal. Furthermore, in a case where the Configured Link is set, this information may be indicated as information regarding a link on which the Non-AP MLD performs reception processing of the signal addressed to broadcast.

A Sounding Timeout field includes information regarding a timeout time during which the AP MLD that is a transmission source of this signal waits for acquisition of the transmission right on another link and stops sounding in a case where the timeout time is exceeded. This information may include numerical information based on a predetermined time unit. The information may include information regarding a time unit. This information may include information regarding a link for which timeout is set or a link for which timeout is managed.

An STA Info field includes information regarding an identifier of the Non-AP MLD to be a sounding target. The STA Info field may be repeated by the number of Non-AP MLDs to be sounding targets. This information may be an identifier of a Non-AP entity in the Non-AP MLD. This information may be an Association Identifier (AID) defined in IEEE 802.11. The STA Info field may include information regarding the resource allocation of the Test signal transmitted by the Non-AP MLD to be a sounding target on the link on which the Sounding Announcement signal is transmitted. The information regarding the resource allocation may include information regarding indexes of a known orthogonal matrix, information regarding an index of frequency interleaving, and information regarding a resource unit (RU) of the OFDMA. The information regarding the resource allocation may include information regarding a transmission parameter of the Test signal transmitted by the Non-AP MLD to be a sounding target. The information regarding the transmission parameters may be information regarding a Modulation and Coding Scheme (MCS).

A Padding field includes information regarding adjustment of the length of the frame.

A Frame Check Sequence (FCS) field includes information regarding error correction.

Figure 7:
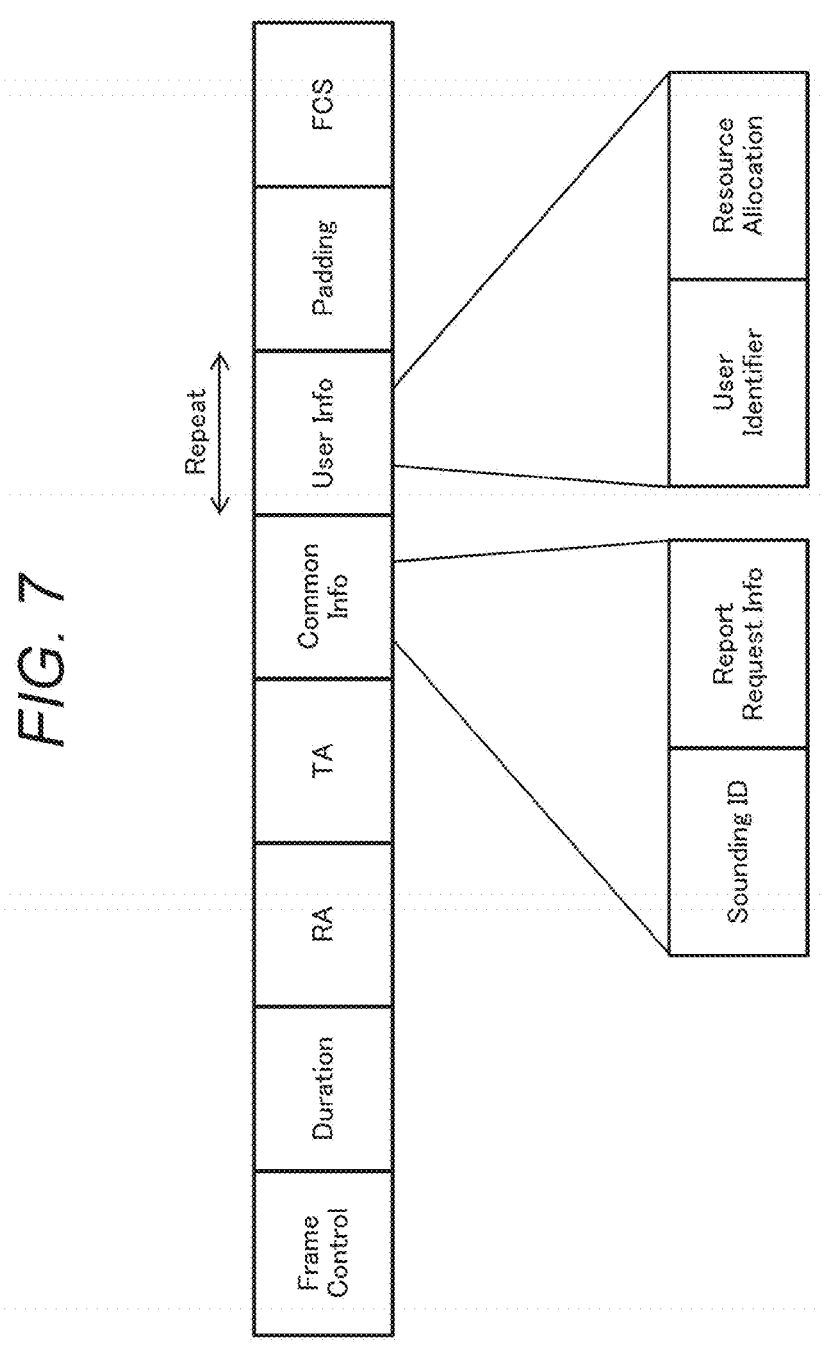
FIG. 7 is a diagram illustrating an example of a frame format of a Sounding Trigger signal.

FIG. 7 illustrates an example of the frame format of the Sounding Trigger signal. Each field of the illustrated frame will be described below.

The Frame Control field includes information regarding setting of the Sounding Trigger signal.

The description regarding respective fields of Duration, RA, and TA is similar to that of the Sounding Announcement signal described above.

A Common Info field includes information addressed to all Non-AP MLDs to be sounding targets. The Common Info field includes a Sounding ID field and a Report Request Info field.

The Sounding ID field includes information regarding a sounding identifier.

The Report Request Info field includes information regarding a request for transmission of the Test signal by the Non-AP MLD to be a sounding target on a link other than the link on which the Sounding Trigger signal is transmitted. This information includes information regarding a link requesting transmission of the Test signal.

A User Info field includes information addressed to each Non-AP MLD to be a sounding target. Furthermore, the User Info field may be repeated by the number of Non-AP MLDs to be sounding targets. Each User Info field includes a User Identifier field and a Resource Allocation field.

The User Identifier field includes information regarding the identifier of the Non-AP MLD to be a sounding target. This information may be an identifier of a Non-AP entity in the Non-AP MLD. This information may be an AID defined in IEEE 802.11.

The Resource Allocation field may include information regarding allocation of resources to be used for transmission of the Test signal by the corresponding Non-AP MLD. The information regarding the resource allocation may include the information regarding indexes of a known orthogonal matrix, the information regarding an index of frequency interleaving, and the information regarding an RU of the OFDMA. The information regarding the resource allocation may include information regarding a transmission parameter of the Test signal transmitted by the corresponding Non-AP MLD. The information regarding the transmission parameter may be the information regarding a modulation and coding scheme (MCS).

The description regarding respective fields of Padding and FCS is similar to that of the Sounding Announcement signal.

Figure 8:
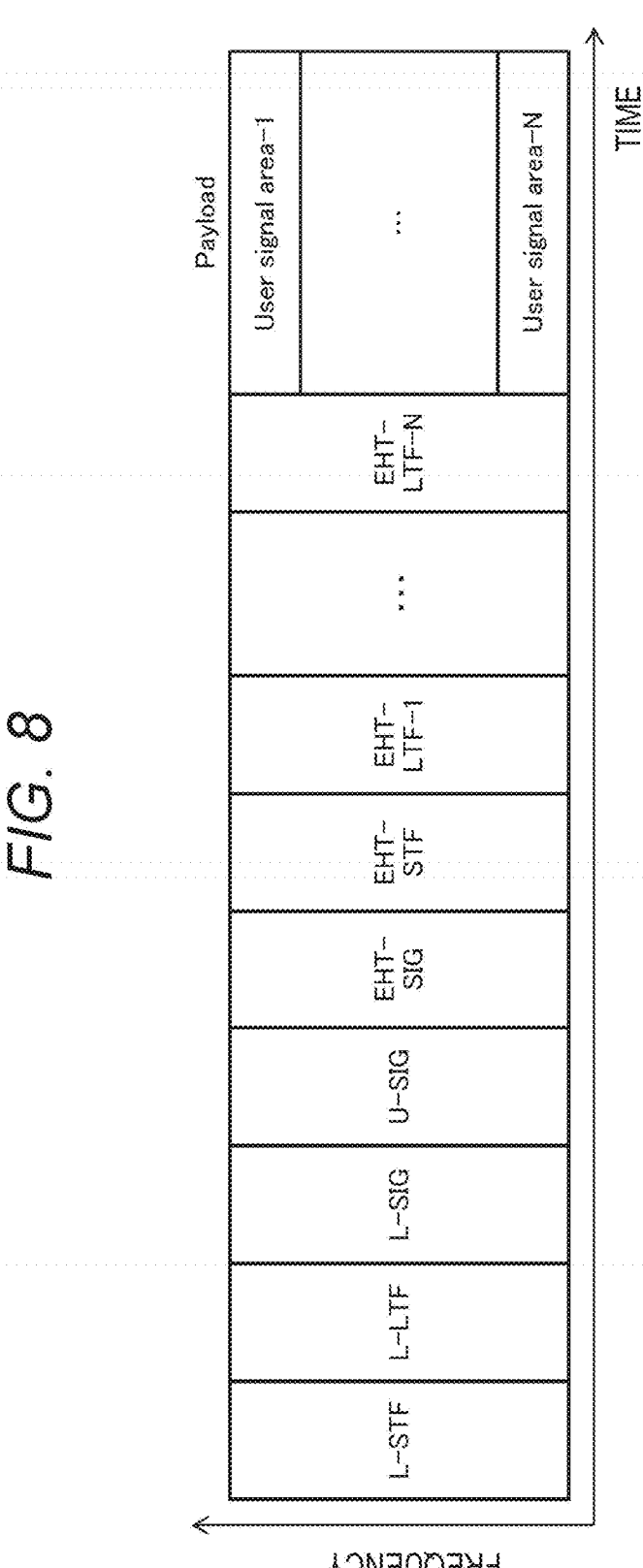
FIG. 8 is a diagram illustrating an example of a frame format of a Test signal.

FIG. 8 illustrates an example of the frame format of the Test signal. Each field of the illustrated frame will be described below. This frame format is modulated by Orthogonal Frequency Division Multiplexing (OFDM).

A Legacy Short Training Field (L-STF) and a Legacy Long Training Field (L-LTF) are known fixed symbols having backward compatibility.

An L-SIG (Legacy Signal field) is a notification area of present frame information having backward compatibility. A U-SIG (Universal Signal field) is a notification area of the present frame information having forward compatibility. An Extremely High Throughput Signal field (EHT-SIG) is a notification area of the present frame information. Information stored in these notification areas may include information indicating that it is a Signal signal of the Test signal.

An EHT-STF is a known fixed symbol. EHT-LTF-1 to EHT-LTF-N are symbols obtained by multiplying a known fixed symbol by components of a certain row in a known N×M (where N and M are integers, and M≥N) orthogonal matrix Q. A row of the orthogonal matrix Q is determined by the information regarding indexes of the known orthogonal matrix specified in the Sounding Announcement signal or the Sounding Trigger signal. In a case where the i-row is specified by this information, the known fixed symbol is multiplied by $Q_{i,\,1}$ in the EHT-LTF-1, and the known fixed symbol is multiplied by $Q_{i,\,N}$ in the EHT-LTF-N. Note that $Q_{i,\,j}$ is an element of i rows and j columns in the orthogonal matrix Q. Thus, N symbols can be multiplexed. EHT-LTF-1 to EHT-LTF-N are transmitted over the entire frequency band used by the present frame. Therefore, the communication device (AP MLD) that has received the Test signal can separate the EHT-LTF-1 to EHT-LTF-N by signal processing, and obtain the received signal strength of the entire frequency band with each of the plurality of communication devices that have transmitted the Test signal.

Furthermore, among the OFDM subcarriers constituting the frame illustrated in FIG. 8, the power may be superimposed only on the subcarrier determined on the basis of the information regarding the index of the frequency interleaving specified by the Sounding Announcement signal or the Sounding Trigger signal. For example, by allocating each of an odd-numbered subcarrier and an even-numbered subcarrier to a single different communication device, the communication device (AP MLD) that has received the Test signal can estimate the received signal strength across the entire frequency band with the two communication devices that have transmitted the Test signal.

A Payload field includes information regarding the transmission power of each communication device that has transmitted the Test signal. Furthermore, the Payload field may include information regarding a buffer status of the Non-AP MLD (in other words, the amount of data to be transmitted included in each communication device that has transmitted the Test signal). The Payload field is transmitted by each of the N communication devices using the specified RU on the basis of the RU of the OFDMA specified by the Sounding Announcement signal or the Sounding Trigger signal. In the example illustrated in FIG. 8, the Payload field is divided into N pieces in a frequency direction and allocated to user areas (User signal area-1 to User signal area-N) of each of the N communication devices. Each user area stores information of transmission power of the Test signal transmitted from a corresponding communication device.

By using the frame format illustrated in FIG. 8 for the Test signal, the communication device (AP MLD) that has received the Test signal can calculate an inverse matrix of Q for the multiplexed signal by using the orthogonal matrix Q, and can separate each signal transmitted by a plurality of communication devices from the index of the orthogonal matrix Q allocated by the communication device itself, the index of the frequency interleaving, and the information regarding the RU of the OFDMA. Thus, the communication device (AP MLD) that has received the Test signal can obtain the received signal strength characteristic over the entire frequency band with the plurality of communication devices that have transmitted the Test signal and the transmission power of each communication device. Therefore, it is possible to calculate the propagation loss in the entire frequency band with the plurality of communication devices that has transmitted the Test signal.

D-3. Operation of Communication Device During Sounding of Uplink

In this section, an operation of each communication device when the sounding of the uplink is performed will be described.

Figure 9:
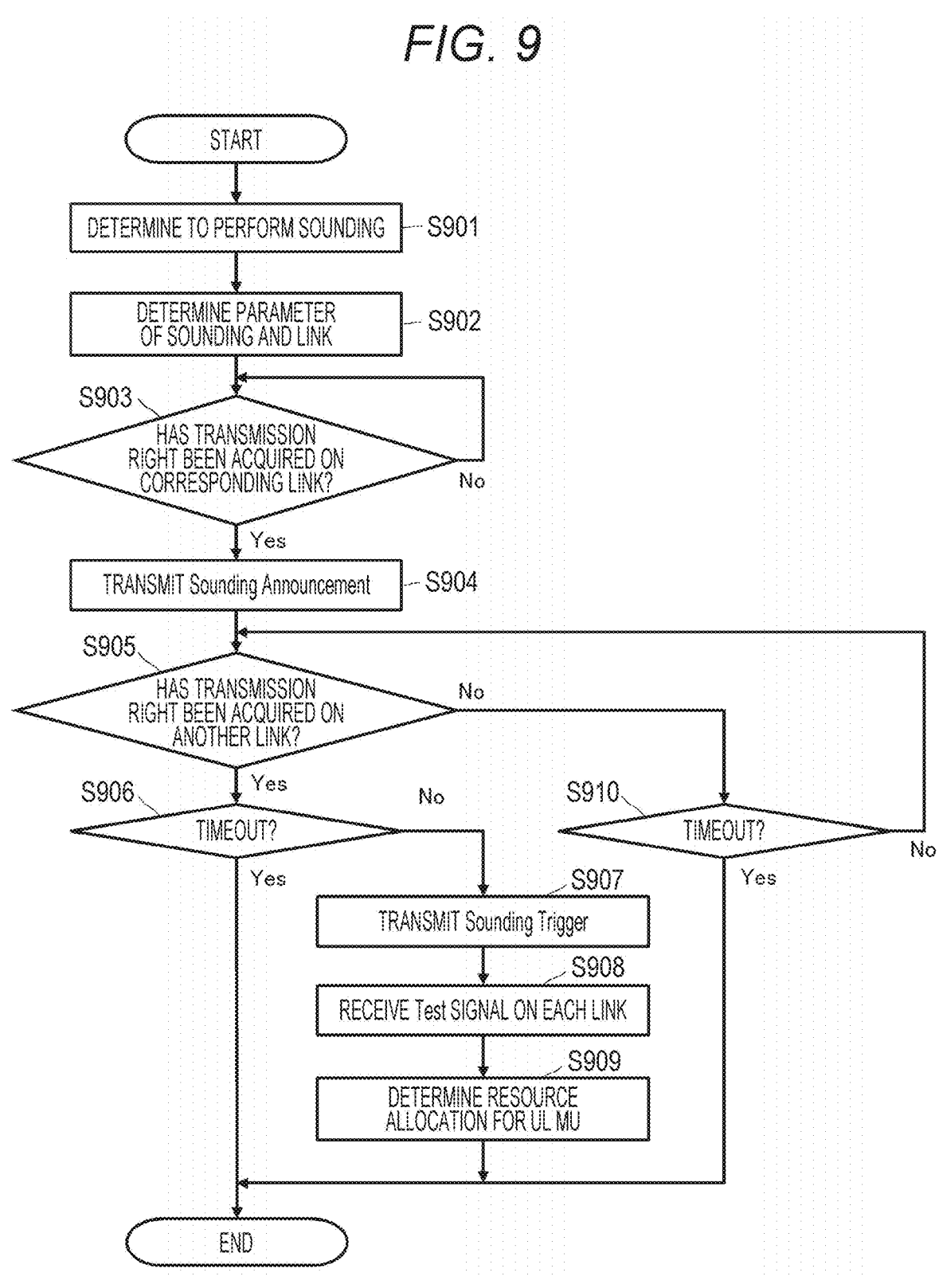
FIG. 9 is a flowchart illustrating a processing procedure executed by AP MLD in a case where sounding of the uplink is performed.

FIG. 9 illustrates a processing procedure executed by the AP MLD in a case where the sounding of the uplink is performed in the form of a flowchart.

First, the AP MLD determines to perform the sounding of up-ring on the basis of a sounding request from the AP entity or on the basis of determination of the AP MLD itself (step S901).

Next, the AP MLD determines a parameter of sounding and a link for starting sounding, and notifies the AP entity corresponding to each link for which sounding is determined to be started (step S902).

Then, when the corresponding AP entity acquires the transmission right on the link for which sounding is determined to be started (Yes in step S903), the AP entity transmits the Sounding Announcement signal indicating that the sounding of the uplink is started (step S904).

When the corresponding AP entity acquires the transmission right on still another link (Yes in step S905), the AP MLD checks whether the Sounding Timeout has been exceeded (step S906). In a case where the Sounding Timeout has been exceeded (Yes in step S906), the AP MLD terminates the present processing.

Furthermore, in a case where the Sounding Timeout has not been exceeded (No in step S906), the AP entity that has acquired the transmission right in step S905 transmits the Sounding Trigger signal on the link for which the transmission right has been acquired (step S907). Thereafter, each AP entity receives the transmitted Test signal induced by the Non-AP MLD in the Sounding Trigger signal on each corresponding link (step S908).

Then, the AP MLD calculates information regarding a propagation loss with each Non-AP MLD on the basis of the information of the Test signal received from each AP entity, determines resource allocation for the UL MU communication (step S909), and ends the present processing. Note that the AP MLD may make a change request of the Enabled Link for the Single RF non-AP MLD or a change request of the Configured Link to the non-AP MLD in which the Configured Link is set on the basis of an observation result of a channel state of each link.

Furthermore, the other link attempts to acquire the transmission right with the corresponding link until the Sounding Timeout is exceeded (No in step S910) (step S905). If the Sounding Timeout has been exceeded (Yes in step S910) while the AP entity does not acquire the transmission right on another link (No in step S905), the AP MLD ends the present processing.

Figure 10:
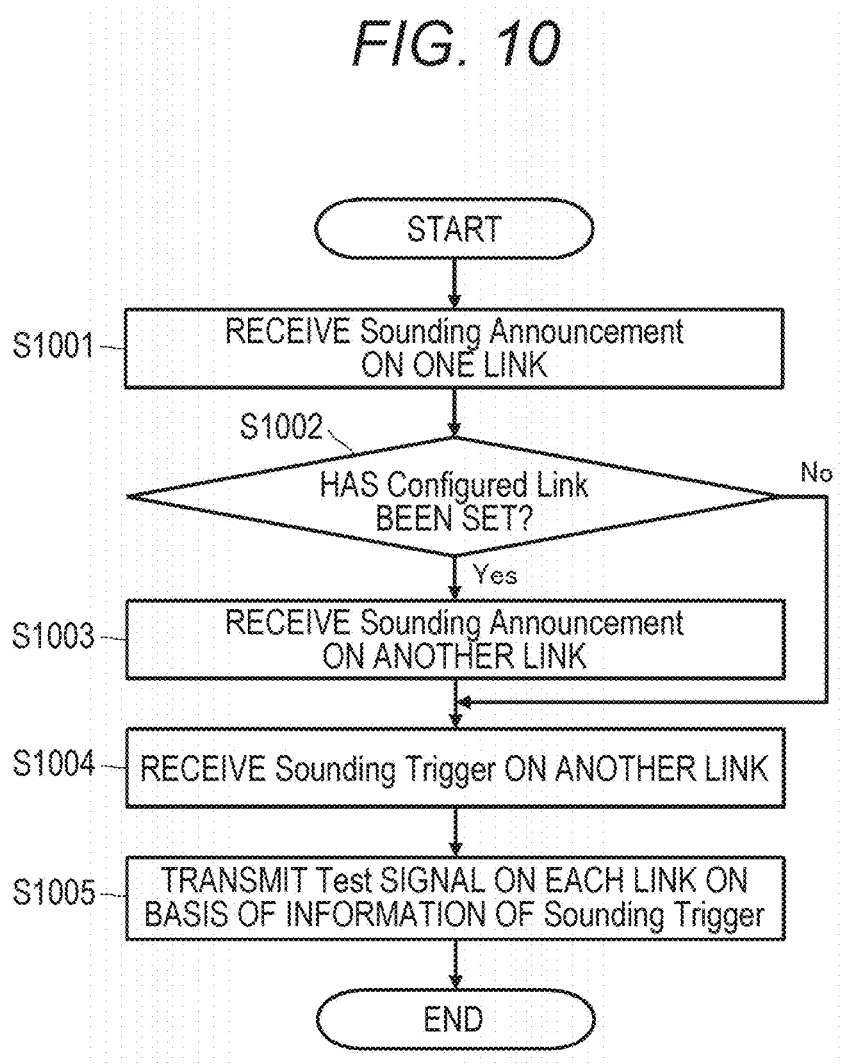
FIG. 10 is a flowchart illustrating a processing procedure executed by Non-AP MLD in a case where the sounding of the uplink is performed.

FIG. 10 illustrates a processing procedure executed by the Non-AP MLD in a case where the sounding of the uplink is performed in the form of a flowchart.

When the non-AP entity receives the Sounding Announcement signal from the connection destination AP MLD in one of the links (step S1001), the Non-AP MLD checks whether or not a link on which the Non-AP MLD itself receives the signal addressed to broadcast, that is, the Configured Link has been set (step S1002). In a case where the Configured Link is set (Yes in step S1002), the Configured Link is set such that the subsequent signal addressed to broadcast is received by another link (step S1003).

Then, upon receiving the Sounding Trigger signal from the AP MLD in another link (step S1004), the Non-AP MLD transmits the Test signal from each non-AP entity to each link on the basis of information of the Sounding Trigger signal (step S1005), and ends the present processing.

Figure 11:
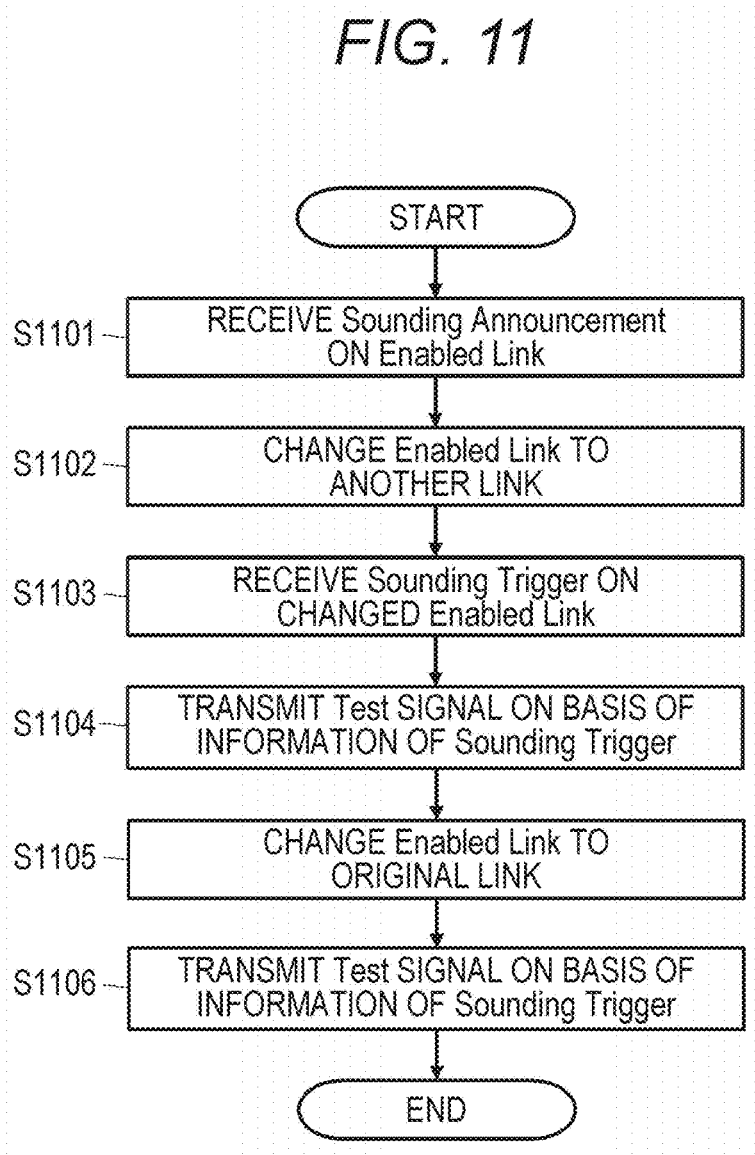
FIG. 11 is a flowchart illustrating a processing procedure executed by Single RF Non-AP MLD in a case where the sounding of the uplink is performed.

FIG. 11 illustrates a processing procedure executed by the Single RF Non-AP MLD in a case where the sounding of the uplink is performed in the form of a flowchart.

When the corresponding non-AP entity in the Enabled Link receives the Sounding Announcement signal from the connection destination AP MLD (step S1101), the Single RF non-AP MLD changes the Enabled Link to another link so that a subsequent signal can be received in another link (step S1102).

Then, when the corresponding non-AP entity receives the Sounding Trigger signal in the changed Enabled Link (step S1103), the Single RF non-AP MLD transmits the Test signal from the Enabled Link on the basis of the information of the Sounding Trigger signal (step S1104).

Thereafter, the Single RF non-AP MLD changes the Enabled Link to the original link (step S1105), transmits the Test signal from the Enabled Link on the basis of the information of the Sounding Trigger signal (step S1104), and ends the present processing.

D-4. Sounding of Down-Ring

Next, an example related to the sounding of the downlink will be described separately for the above described cases (1) to (3).

Figure 12:
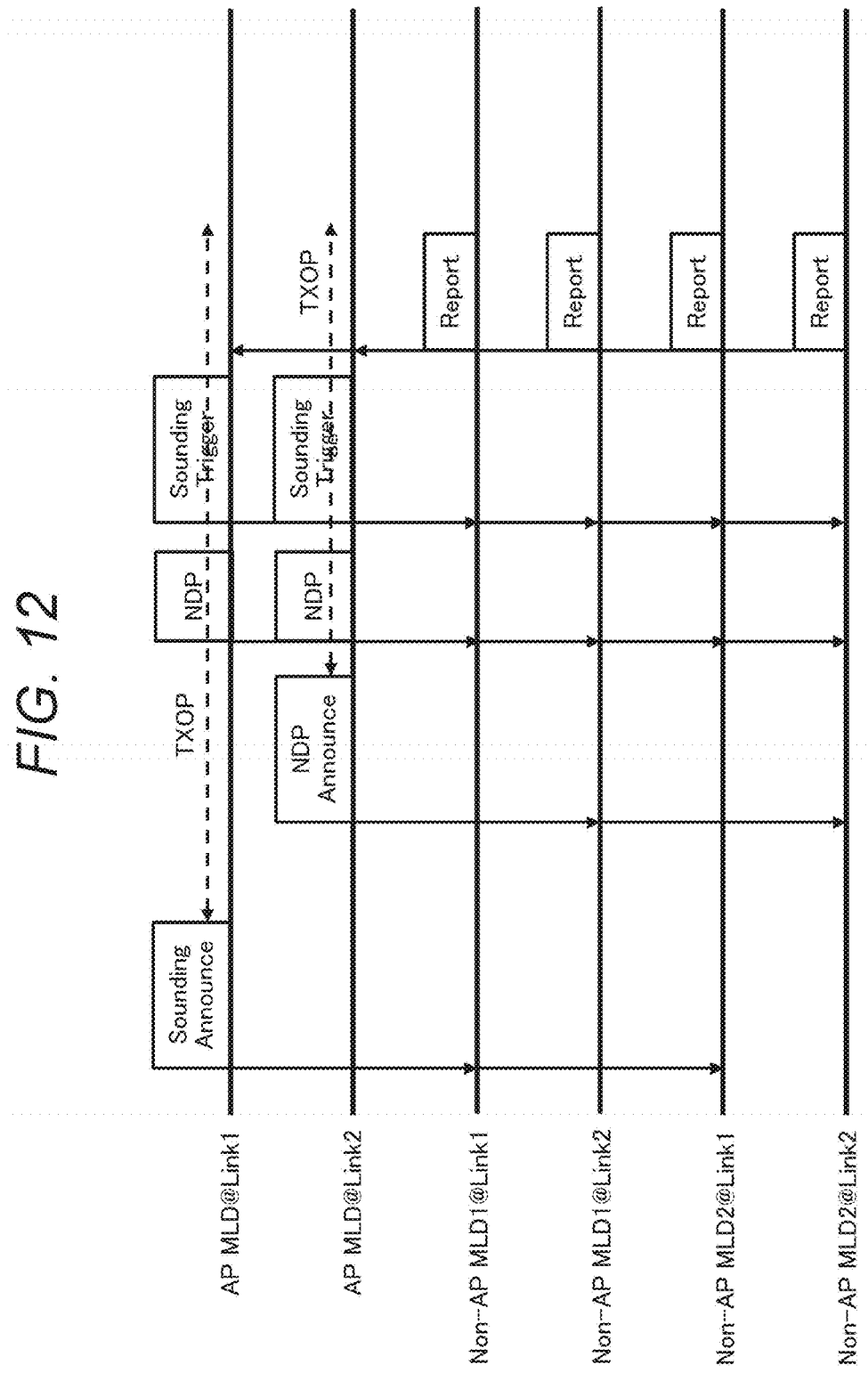
FIG. 12 is a diagram illustrating a communication sequence example (case (1)) in which sounding of downlink is performed.

FIG. 12 illustrates a communication sequence example in which the sounding of the downlink is performed in the case (1) where the Non-AP MLD is connected to the AP MLD. Here, the communication system illustrated in FIG. 1 is assumed, and the Non-AP MLD1 and the Non-AP MLD2 that support MLO are both connected to the AP MLD by the Link1 and the Link2.

Note that a horizontal axis in FIG. 12 is a time axis, and indicates a communication operation on each link of the AP MLD, the Non-AP MLD1, and the Non-AP MLD2 at every time. A square block drawn by a solid line indicates a transmission frame at a corresponding communication device, link, and time, and an arrow of a solid line in the vertical direction indicates frame transmission to a destination.

Before starting this communication sequence, it is confirmed that the AP MLD and the Non-AP MLD1 and Non-AP MLD2 support MLO and support the sounding method illustrated in FIG. 12. Furthermore, before starting this communication sequence, the AP MLD and the Non-AP MLD1 and Non-AP MLD2 may perform calibration for correcting transmission and reception circuit errors and the like of both. This calibration may be performed on the basis of a Calibration procedure specified in IEEE 802.11.

Upon acquiring the transmission right on the Link1, the AP MLD transmits the Sounding Announcement signal including information regarding start of the sounding of the downlink on the Link1. Note that the AP MLD may transmit a signal for acquiring the transmission right before the Announcement signal. This signal may be an RTS frame or a CTS frame defined in IEEE 802.11. The CTS frame may be a CTS-to-self frame transmitted to itself. With the signal for acquiring the transmission right, surrounding communication terminals suppress communication.

The AP MLD transmits the Sounding Announcement signal to the broadcast address. The Sounding Announcement signal used in the sounding of the downlink may include information regarding an identifier of the sounding, information regarding a transmission link of the subsequent Sounding Trigger signal or the Sounding Announcement signal transmitted by the AP MLD, information regarding a time until starting transmission of an NDP signal on another link, information regarding a timeout time during which the AP MLD waits for acquisition of the transmission right on another link and starts transmission of the NDP signal in a case where the timeout time is exceeded, information regarding a timeout time during which the AP MLD waits for acquisition of the transmission right on another link and stops the sounding in a case where the timeout time is exceeded, information regarding an identifier of the Non-AP MLD to be a sounding target, and information regarding resource allocation of a Report signal transmitted by the Non-AP MLD to be the sounding target in a link on which the Sounding Announcement signal is transmitted. Details of the Sounding Announcement signal used in the sounding of the downlink will be described later.

Upon receiving the Sounding Announcement signal from the AP MLD on the Link1, the Non-AP MLD1 and the Non-AP MLD2 suppress the transmission other than the sounding.

Next, the AP MLD acquires the transmission right on the Link2, and transmits an NDP Announcement signal indicating that the NDP signal is transmitted on the Link2. Note that, although not illustrated in FIG. 12, the AP MLD may transmit a signal for acquiring the transmission right before the NDP Announcement signal. The NDP Announcement signal may be the Sounding Announcement signal or the NDP Announcement signal defined in IEEE 802.11. Furthermore, the NDP signal is a signal including only known fixed symbols and is a signal not including data in the Payload.

Upon receiving the NDP Announcement signal from the AP MLD on the Link2, the Non-AP MLD1 and the Non-AP MLD2 suppress the transmission other than the sounding.

Note that, in a case where there are three or more links that can be used for MLO in the assumed communication system, the AP MLD may transmit the Sounding Announcement signal in a plurality of links, and may transmit an NDP Announcement signal indicating that the Sounding Announcement signal or the NDP signal is transmitted on the last link.

Furthermore, in a case where the AP MLD can acquire the transmission right simultaneously in a plurality of links, the AP MLD may simultaneously transmit one or more Sounding Announcement signals and NDP Announcement signals in respective links.

The AP MLD transmits the Sounding Announcement signal and the NDP Announcement signal on the Link1 and the Link2, respectively, and then transmits the NDP signal on the Link1 and the Link2 at the same timing. The AP MLD may perform the NDP signal after a fixed time from completion of transmission of the last transmitted Sounding Announcement signal or NDP Announcement signal, or may perform the NDP signal after the SIFS interval.

Upon receiving the NDP signal from the AP MLD on the Link1 and the Link2, the Non-AP MLD1 and the Non-AP MLD2 observe signal reception strength or a channel state on the basis of reception results thereof.

After transmitting the NDP signal on the Link1 and the Link2, the AP MLD transmits the Sounding Trigger signal that induces transmission of the Report signal for reporting a sounding result. Note that, although not illustrated in FIG. 12, the AP MLD may transmit the signal for acquiring the transmission right (described above) before the Sounding Trigger signal. The AP MLD may transmit the Sounding Trigger signal simultaneously on both links of the Link1 and the Link2 as illustrated in FIG. 12, or may transmit the Sounding Trigger signal only on one link. The Sounding Trigger signal is transmitted to the broadcast address. The Sounding Trigger signal may include information regarding an identifier of sounding, information regarding a request for transmission of the Report signal by the non-AP MLD to be the target of sounding on a link other than the link on which the Sounding Trigger signal is transmitted, information regarding the identifier of the non-AP MLD to be the target of sounding, and information regarding resource allocation of the Report signal transmitted by the non-AP MLD to be the target of sounding. The Sounding Trigger signal may be in the frame format illustrated in FIG. 7.

Upon receiving the Sounding Trigger signal from the AP MLD on the Link1 or the Link2, the Non-AP MLD1 and the Non-AP MLD2 transmit the Report signal on the link on which the Sounding Trigger signal has been received on the basis of the information of the Sounding Announcement signal and the Sounding Trigger signal. In the communication sequence example illustrated in FIG. 12, since the Sounding Trigger signal is transmitted on both links of the Link1 and the Link2, the Non-AP MLD1 and the Non-AP MLD2 transmit the Report signals on both the links. The Non-AP MLD1 and the Non-AP MLD2 may transmit the Report signal after the fixed time from the completion of the reception of the Sounding Trigger signal or after the SIFS interval. The Non-AP MLD1 and the Non-AP MLD2 include, in the Report signal, information of the signal reception strength or the channel state observed on the basis of a reception result of the NDP signal from the AP MLD. Furthermore, the Non-AP MLD1 and the Non-AP MLD2 may include information regarding transmission power in the Report signal.

Upon receiving the Report signals from the Non-AP MLD1 and the Non-AP MLD2, the AP MLD calculates a propagation loss of the downlink or a channel matrix with each of the Non-AP MLD1 and the Non-AP MLD2 on the basis of the signal reception strength or the channel state stored in each Report signal. Further, in a case where each of the received Report signals includes the information regarding the transmission power of the Non-AP MLD1 and the Non-AP MLD2, the AP MLD also calculates the information regarding the propagation loss of the uplink with each of the Non-AP MLD1 and the Non-AP MLD2 from the received signal strength and the information regarding the transmission power. Furthermore, the AP MLD may calculate weight information used when the Non-AP MLD1 and Non-AP MLD2 and the Single RF Non-AP MLD perform the UL MU-MIMO from information of calibration performed in advance and information stored in each received Report signal.

Thereafter, the AP MLD determines the resource allocation for the UL and DL MU communication on the basis of the calculated information regarding the channel matrix and the propagation loss with each of Non-AP MLD1 and Non-AP MLD2.

By the communication sequence illustrated in FIG. 12, the AP MLD can collect propagation losses in bands of a plurality of links while maintaining a time correlation. Furthermore, the AP MLD can allocate resources for the MU communication in consideration of propagation losses of all links.

Figure 13:
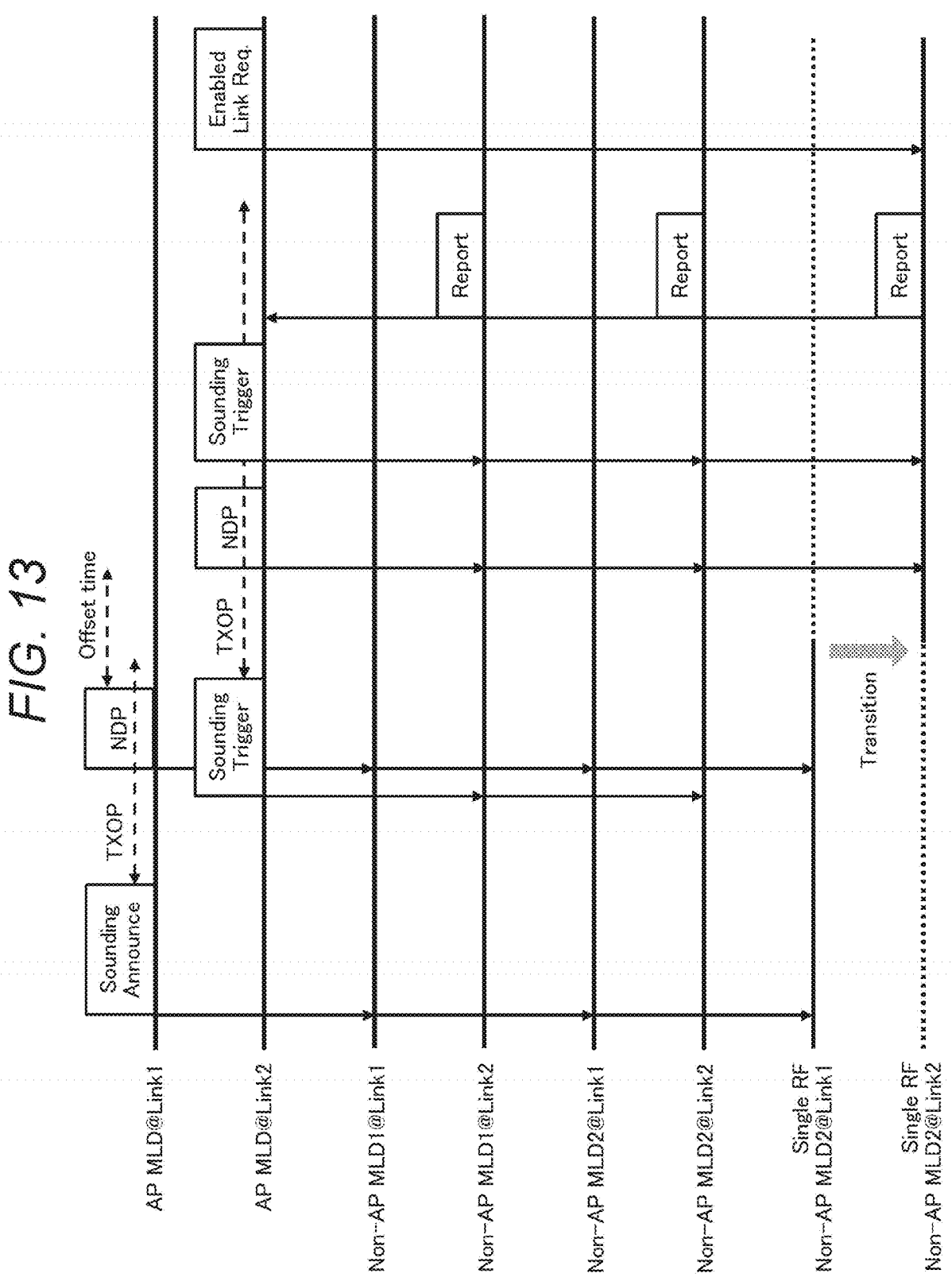
FIG. 13 is a diagram illustrating a communication sequence example (case (2)) in which the sounding of the downlink is performed.

FIG. 13 illustrates a communication sequence example in which the sounding of the downlink is performed in the case (2) where Non-AP MLD and Single RF Non-AP MLD are connected to the AP MLD. Here, the communication system illustrated in FIG. 1 is assumed, and the Non-AP MLD1 and the Non-AP MLD2 that support MLO are both connected to the AP MLD by the Link1 and the Link2. Furthermore, the Single RF Non-AP MLD is connected to the AP MLD by switching the Enabled Link on which signal transmission and reception are enabled between the Link1 and the Link2 as needed.

Note that a horizontal axis in FIG. 13 is a time axis, and indicates a communication operation on each link of the AP MLD, the Non-AP MLD1 and Non-AP MLD2, and the Single RF Non-AP MLD at every time. A square block drawn by a solid line indicates a transmission frame at a corresponding communication device, link, and time, and an arrow of a solid line in the vertical direction indicates frame transmission to a destination.

Before starting this communication sequence, it is confirmed that the AP MLD, the Non-AP MLD1 and Non-AP MLD2, and the Single RF Non-AP MLD support MLO and support the sounding method illustrated in FIG. 13. Furthermore, before the start of this communication sequence, between the AP MLD and the Single RF Non-AP MLD, the Single RF Non-AP MLD shares the information regarding the Enabled Link. In this communication sequence, it is assumed that the Single RF Non-AP MLD has set the Link1 to the Enabled Link. Furthermore, before starting this communication sequence, the AP MLD, the Non-AP MLD1 and Non-AP MLD2, and the Single RF Non-AP MLD may perform calibration for correcting transmission and reception circuit errors and the like of both.

Upon acquiring the transmission right on the Link1, the AP MLD transmits the Sounding Announcement signal including information regarding the start of sounding on the Link1.

Upon receiving the Sounding Announcement signal from the AP MLD on the Link1, the Non-AP MLD1 and Non-AP MLD2 and the Single RF Non-AP MLD suppress the transmission other than the sounding.

Next, the AP MLD obtains the transmission right on the Link2, and transmits the Sounding Announcement signal including information regarding the start of sounding on the Link2.

Upon receiving the Sounding Announcement signal from the AP MLD on the Link2, the Non-AP MLD1 and the Non-AP MLD2 suppress the transmission other than the sounding.

Note that, in a case where there are three or more links that can be used for MLO in the assumed communication system, the AP MLD may transmit the Sounding Announcement signal in a plurality of links, and may transmit the Sounding Announcement signal on the last link.

The AP MLD transmits the Sounding Announcement signal on the Link2, and then transmits the NDP signal on the Link1. Note that, in a case where there are three or more links that can be used for MLO in the assumed communication system, the AP MLD transmits the NDP signal on the Link1 after transmitting the Sounding Announcement signal on the last link.

Upon receiving the NDP signal from the AP MLD on the Link1, the Non-AP MLD1 and Non-AP MLD2 and the Single RF Non-AP MLD observe the signal reception strength or the channel state on the basis of a reception result thereof.

Furthermore, after the NDP signal from the AP MLD is received on the Link1, the Single RF Non-AP MLD changes, on the basis of information regarding a time until transmission of the NDP signal is started in another link (the Link2) indicated by the Sounding Announcement signal, the Enabled Link from the Link1 to the Link2 so as to be on the time.

On the basis of the information regarding a time until transmission of the NDP signal in another link (the Link2) indicated by the Sounding Announcement signal is started after transmitting the NDP signal on the Link1, the AP MLD waits until the time, and thereafter transmits the NDP signal on the Link2.

Upon receiving the NDP signal from the AP MLD on the Link2, the Non-AP MLD1 and Non-AP MLD2 and the Single RF Non-AP MLD observe the signal reception strength or the channel state on the basis of a reception result thereof.

After transmitting the NDP signal on the Link1 and the Link2, the AP MLD transmits, on the Link2, the Sounding Trigger signal that induces transmission of the Report signal for reporting a sounding result. Note that, although not illustrated in FIG. 13, the AP MLD may transmit the signal for acquiring the transmission right (described above) before the Sounding Trigger signal. The Sounding Trigger signal may be in the frame format illustrated in FIG. 7.

Upon receiving the Sounding Trigger signal from the AP MLD, the Non-AP MLD1 and Non-AP MLD2 and the Single RF Non-AP MLD transmit the Report signal on the link on which the Sounding Trigger signal has been received on the basis of the information of the Sounding Announcement signal and the Sounding Trigger signal. The Non-AP MLD1 and Non-AP MLD2 and the Single RF Non-AP MLD include, in the Report signal, the information of the signal reception strength or the channel state observed on the basis of a reception result of the NDP signal from the AP MLD. Furthermore, the Non-AP MLD1 and Non-AP MLD2 and the Single RF Non-AP MLD may include information regarding the transmission power in the Report signal.

In the communication sequence example illustrated in FIG. 13, since the Sounding Trigger signal is transmitted on the Link2, the Non-AP MLD1 and Non-AP MLD2 and the Single RF Non-AP MLD transmit the Report signal on the Link2. In the Non-AP MLD1 and Non-AP MLD2 and the Single RF Non-AP MLD, the transmission of the Report signal may be performed after a fixed time from the completion of the reception of the Sounding Trigger signal, or may be performed after the SIFS interval.

Upon receiving the Report signals from the Non-AP MLD1 and Non-AP MLD2 and the Single RF Non-AP MLD, the AP MLD calculates the propagation loss of the downlink or the channel matrix with each of the Non-AP MLD1 and Non-AP MLD2 and the Single RF Non-AP MLD on the basis of the signal reception strength or the channel state stored in each Report signal. Further, in a case where each of the received Report signals includes the information regarding the transmission power of the Non-AP MLD1 and Non-AP MLD2 and the Single RF Non-AP MLD, the AP MLD also calculates the information regarding the propagation loss of the uplink with each of the Non-AP MLD1 and Non-AP MLD2 and the Single RF Non-AP MLD from the received signal strength and the information regarding the transmission power. Furthermore, the AP MLD may calculate the weight information used when the Non-AP MLD1 and Non-AP MLD2 and the Single RF Non-AP MLD perform the UL MU-MIMO from information of calibration performed in advance and information stored in each received Report signal.

Thereafter, the AP MLD decides the resource allocation of the UL and DL MU communication on the basis of the calculated information regarding the channel matrix and the propagation loss with each of the Non-AP MLD1 and Non-AP MLD2 and the Single RF Non-AP MLD.

Note that, in a case where it is necessary to change the Enabled Link of the Single RF Non-AP MLD during the determination, the AP MLD may transmit a signal requesting the Single RF Non-AP MLD to change the Enabled Link. For example, in a case where it is found that the channel state between the AP and the Single RF Non-AP MLD is better at the Link1 than at the Link2 as a result of observing the channel state, the AP MLD transmits, to the Single RF Non-AP MLD, a signal requesting the Single RF Non-AP MLD to switch the Enabled Link to the Link1.

The signal of the change request of the Enabled Link includes information of the Enabled Link after the change, but may further include information regarding a reason of the change request. Furthermore, in a case where the AP MLD calculates the weight information of the UL MU-MIMO, the signal of the change request may include the weight information. The weight information may be information corresponding to the Compressed Beamforming Report defined in IEEE 802.11.

By the communication sequence illustrated in FIG. 13, even in the case (2) where the Non-AP MLD and Single RF Non-AP MLD are connected to the AP MLD, the AP MLD can collect propagation losses in bands of a plurality of links while maintaining a time correlation. Furthermore, the AP MLD can allocate resources for the MU communication in consideration of propagation losses of all links.

Figure 14:
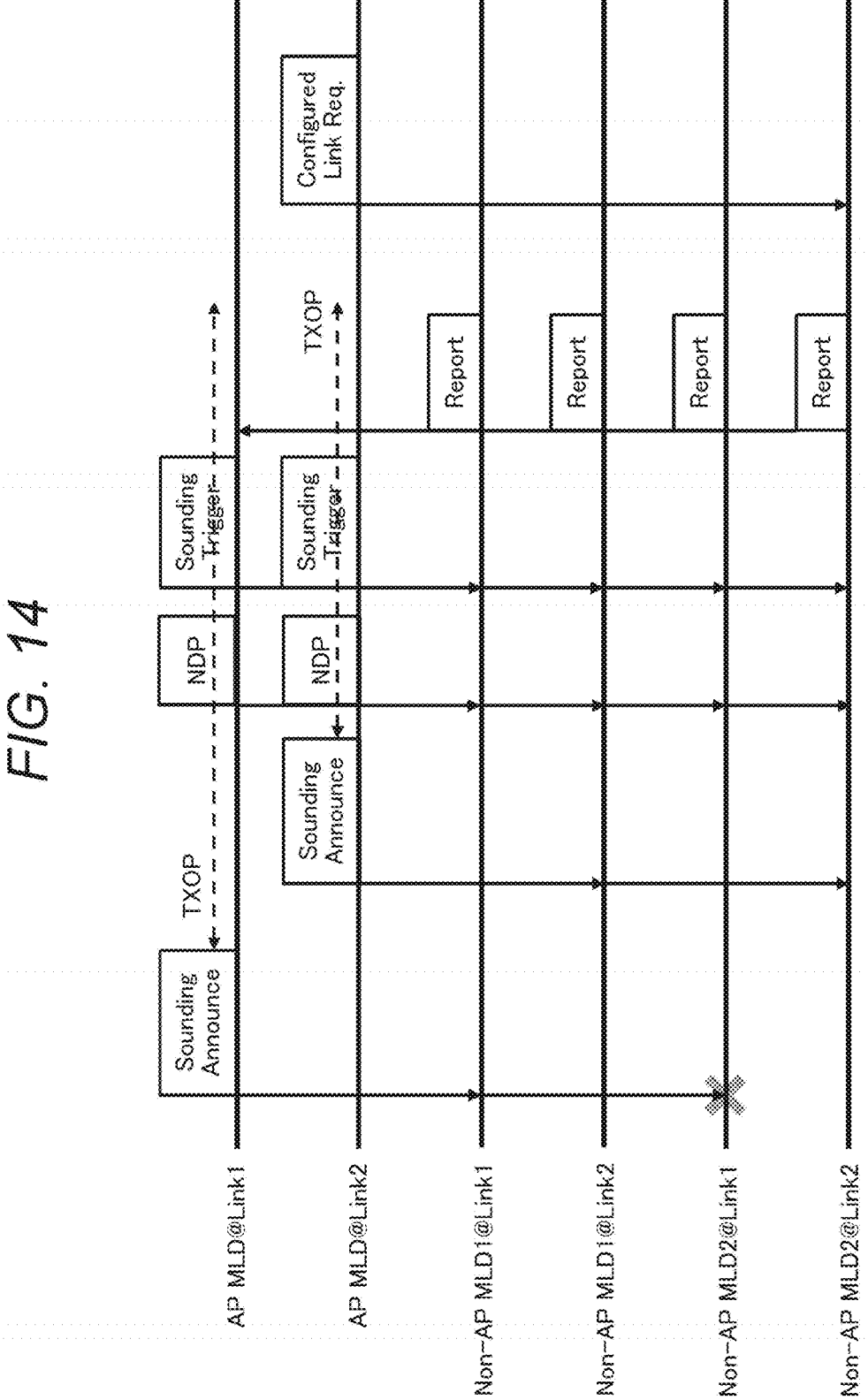
FIG. 14 is a diagram illustrating a communication sequence example (case (3)) in which the sounding of the downlink is performed.

FIG. 14 illustrates an example of a communication sequence in which the sounding of the downlink is performed in the case (3) where the Configured Link is set. Here, the communication system illustrated in FIG. 1 is assumed, and the Non-AP MLD1 and the Non-AP MLD2 that support MLO are both connected to the AP MLD by the Link1 and the Link2.

Note that a horizontal axis in FIG. 14 is a time axis, and indicates a communication operation on each link of the AP MLD, the Non-AP MLD1, and the Non-AP MLD2 at every time. A square block drawn by a solid line indicates a transmission frame at a corresponding communication device, link, and time, and an arrow of a solid line in the vertical direction indicates frame transmission to a destination.

Before starting this communication sequence, it is confirmed that the AP MLD and the Non-AP MLD1 and Non-AP MLD2 support MLO and support the sounding method illustrated in FIG. 14. Furthermore, before the start of this communication sequence, the AP MLD and the Non-AP MLD1 and Non-AP MLD2 confirm information regarding the Configured Link which is a link for reception processing of the signal addressed to broadcast. In the communication sequence example illustrated in FIG. 5, it is assumed that the Non-AP MLD1 has set the Link1 to the Configured Link and the Non-AP MLD2 has set the Link2 to the Configured Link. Furthermore, before starting this communication sequence, the AP MLD and the Non-AP MLD1 and Non-AP MLD2 may perform calibration for correcting transmission and reception circuit errors and the like of both.

Upon acquiring the transmission right on the Link1, the AP MLD transmits the Sounding Announcement signal including information regarding the start of sounding on the Link1.

The Non-AP MLD1 that has set the Link1 to the Configured Link receives the Sounding Announcement signal from the AP MLD, and performs setting such to perform reception processing of the signal addressed to broadcast on the Link2, which is not the Configured Link, on the basis of the information regarding the transmission link of the subsequent Sounding Trigger signal or the Sounding Announcement signal transmitted by the AP MLD notified by the signal. Furthermore, the Non-AP MLD1 suppresses communication other than this sounding.

Further, the Non-AP MLD2 that has set the Link2 to the Configured Link may receive the Sounding Announcement signal from the AP MLD, and may stop the signal reception processing at the stage of confirming that the destination address of the signal is the broadcast address. Furthermore, the Non-AP MLD2 suppresses communication other than this sounding.

Next, the AP MLD acquires the transmission right on the Link2, and transmits a signal indicating that the NDP signal is transmitted on the Link2. The signal indicating that the NDP signal is transmitted may be the Sounding Announcement signal or the NDP Announcement signal defined in IEEE 802.11. In the example illustrated in FIG. 14, the Sounding Announcement signal is used.

The Non-AP MLD1 and the Non-AP MLD2 receive the signal indicating that the NDP signal is transmitted on the Link2, and suppress communication other than the sounding.

Note that, in a case where there are three or more links that can be used for MLO in the assumed communication system, the AP MLD may transmit the Sounding Announcement signal in a plurality of links, and may transmit the signal indicating that the NDP signal is transmitted on the last link.

The AP MLD transmits the signal indicating that the NDP signal is transmitted on the Link1 and the Link2, and then transmits the NDP signal on the Link1 and the Link2 at the same timing. The AP MLD may perform the NDP signal after the fixed time from completion of transmission of the last transmitted Sounding Announcement signal or signal indicating that the NDP signal is transmitted, or may be performed after the SIFS interval.

Upon receiving the NDP signal from the AP MLD on the Link1 and the Link2, the Non-AP MLD1 and the Non-AP MLD2 observe signal reception strength or a channel state on the basis of reception results thereof.

After transmitting the NDP signal on the Link1 and the Link2, the AP MLD transmits the Sounding Trigger signal that induces transmission of the Report signal for reporting a sounding result. Note that, although not illustrated in FIG.

14, the AP MLD may transmit the signal for acquiring the transmission right (described above) before the Sounding Trigger signal. The AP MLD may transmit the Sounding Trigger signal simultaneously on both links of the Link1 and the Link2 as illustrated in FIG. 14, or may transmit the Sounding Trigger signal only on one link. The Sounding Trigger signal is transmitted to the broadcast address. The Sounding Trigger signal may be in the frame format illustrated in FIG. 7.

Upon receiving the Sounding Trigger signal from the AP MLD on the Link1 or the Link2, the Non-AP MLD1 and the Non-AP MLD2 transmit the Report signal on the link on which the Sounding Trigger signal has been received on the basis of the information of the Sounding Announcement signal and the Sounding Trigger signal. In the communication sequence example illustrated in FIG. 14, since the Sounding Trigger signal is transmitted on both links of the Link1 and the Link2, the Non-AP MLD1 and the Non-AP MLD2 transmit the Report signal on both the links. The Non-AP MLD1 and the Non-AP MLD2 may transmit the Report signal after the fixed time from the completion of the reception of the Sounding Trigger signal or after the SIFS interval. The Non-AP MLD1 and the Non-AP MLD2 include, in the Report signal, the information of the signal reception strength or the channel state observed on the basis of a reception result of the NDP signal from the AP MLD. Furthermore, the Non-AP MLD1 and the Non-AP MLD2 may include information regarding transmission power in the Report signal.

Upon receiving the Report signals from the Non-AP MLD1 and the Non-AP MLD2, the AP MLD calculates the propagation loss of the downlink or the channel matrix with each of the Non-AP MLD1 and the Non-AP MLD2 on the basis of the signal reception strength or the channel state stored in each Report signal. Further, in a case where each of the received Report signals includes the information regarding the transmission power of the Non-AP MLD1 and the Non-AP MLD2, from the received signal strength and the information regarding the transmission power, the AP MLD also calculates the information regarding the propagation loss of the uplink with each of the Non-AP MLD1 and the Non-AP MLD2. Furthermore, the AP MLD may calculate the weight information used when the Non-AP MLD1 and Non-AP MLD2 and the Single RF Non-AP MLD perform the UL MU-MIMO from information of calibration performed in advance and information stored in each received Report signal.

Thereafter, the AP MLD determines the resource allocation for the UL and DL MU communication on the basis of the calculated information regarding the channel matrix and the propagation loss with each of Non-AP MLD1 and Non-AP MLD2. Note that, in a case where it is necessary to change the Configured Link set by the Non-AP MLD1 or the Non-AP MLD2 at the time of this determination, the AP MLD may send a signal requesting the Non-AP MLD1 or the Non-AP MLD2 to change the Configured Link. For example, in a case where it is found that the channel state between the AP and the Non-AP MLD2 is better at the Link1 than the Link2 as a result of observing the channel state, the AP MLD transmits, to the Non-AP MLD2, a signal requesting the Non-AP MLD2 to switch the Configured Link to the Link1.

The signal of the change request of the Configured Link includes information of the Configured Link after the change, but may further include information regarding a reason of the change request. Furthermore, in a case where the AP MLD calculates the weight information of the UL MU-MIMO, this signal may include the weight information. The weight information may be information corresponding to the Compressed Beamforming Report defined in IEEE 802.11.

By the communication sequence illustrated in FIG. 14, the AP MLD can collect propagation losses in bands of a plurality of links while maintaining a time correlation. Furthermore, the AP MLD can allocate resources for the UL and DL MU communication in consideration of propagation losses of all links.

D-5. Frame Format of Signal Used for Sounding of Downlink

In this section, a frame format of a signal used in a communication sequence for the sounding of the downlink will be described. A frame format of a signal used in the sounding of the uplink has already been described in D-2. Signals that also use the same frame format in the sounding of the downlink as a signal used in the sounding of up-ring are not described herein.

Figure 15:
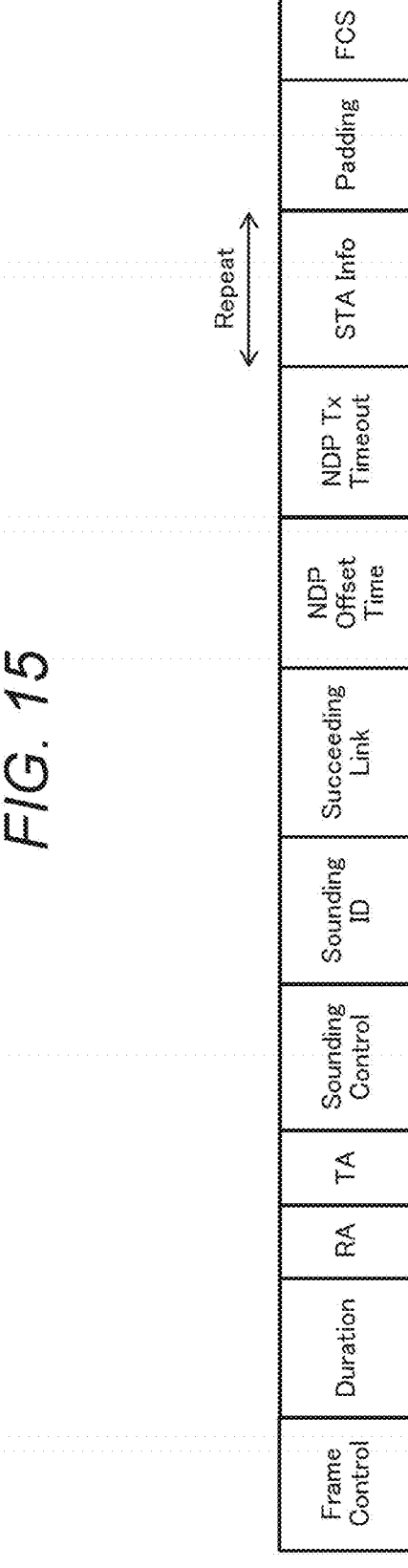
FIG. 15 is a diagram illustrating an example of a frame format of a Sounding Announcement signal.

FIG. 15 illustrates an example of a frame format of the Sounding Announcement signal used in the sounding of the downlink. Each field of the illustrated frame will be described below.

The description regarding respective fields of Frame Control, Duration, RA, and TA is similar to that of the Sounding Announcement signal illustrated in FIG. 6.

A Sounding Control field includes information regarding a notification that sounding according to the present disclosure is performed. This information may be included in the Frame Control field. This information may include information indicating that a period from after the transmission of the Sounding Announcement signal to the transmission of the NDP signal and the transmission of the Report signal is not a fixed time interval, information indicating that the period is not the SIFS interval, or information indicating that the period is Delayed sounding.

The description regarding respective fields of the Sounding ID and the Succeeding Link is similar to that of the Sounding Announcement signal illustrated in FIG. 6.

An NDP Offset Time field includes information regarding an offset time from after the AP MLD, which is a transmission source of the Sounding Announcement signal, transmits the NDP signal on the link on which the Sounding Announcement signal has been transmitted until starting transmission of the NDP signal in another link. This information may include numerical information based on the predetermined time unit. The information may include information regarding the time unit. This information may include information regarding the link for which timeout is set or the link for which timeout is managed.

An NDP Tx Timeout field includes information regarding a timeout time during which the AP MLD that is the transmission source of the Sounding Announcement signal waits for acquisition of the transmission right on another link, and starts transmission of the NDP on the link that has transmitted the Sounding Announcement signal in a case where the timeout time is exceeded. This information may be determined on the basis of information regarding Transition (change of Enabled Link) notified from the Single RF non-AP MLD. This information may include numerical information based on the predetermined time unit. The information may include information regarding the time unit. The above information may include information regarding the link for which timeout is set or the link for which timeout is managed.

The description regarding respective fields of STA Info, Padding, and FCS is similar to that of the Sounding Announcement signal illustrated in FIG. 6.

The frame format of the Sounding Trigger signal used in the sounding of the downlink is the same as the frame format of the Sounding Trigger signal used in the sounding of up-ring illustrated in FIG. 7. However, the information included in the Resource Allocation field is the information regarding resource allocation of the Report signal transmitted by the Non-AP MLD.

The frame format of the Report signal used in the sounding of the downlink is the same as the frame format of the Test signal used in the sounding of the uplink illustrated in FIG. 8. However, in the Payload field, observation information of the NDP in each of the Non-AP MLD and the Single RF non-AP MLD, or observation information of the NDP and the information regarding the transmission power are stored in fields (User signal area-1 to User signal area-N) multiplexed by frequency division. The observation information of the NDP may be information regarding received signal strength, or may be information corresponding to the Compressed Beamforming Report defined in IEEE 802.11. Furthermore, in a case where the transmission power information of the Non-AP MLD is not included, EHT-LTF-1 to EHT-LTF-N may be omitted.

D-6. Series of Communication Sequences of Sounding of Downlink

A series of communication sequences in the sounding of the downlink is also indicated as follows.

An EHT beamformer starts a sounding feedback sequence by transmitting an EHT NDP Announcement frame followed by an EHT NDP after the SIFS interval.

The EHT beamformer identifies an EHT beamformee by including, in the EHT NDP Announcement frame, the STA Info field corresponding to each EHT beamformee expected to transmit a Compressed Beamforming feedback, and including the AID of the EHT beamformee in the STA Info field.

The EHT NDP Announcement frame includes at least one STA Info field. The EHT NDP frame is transmitted after the SIFS interval from the completion of transmission of the EHT NDP Announcement frame, or at a timing specified by the EHT NDP Announcement frame.

D-7. Operation of Communication Device During Sounding of Downlink

In this section, the operation of each communication device when performing the sounding of the downlink will be described.

Figure 16:
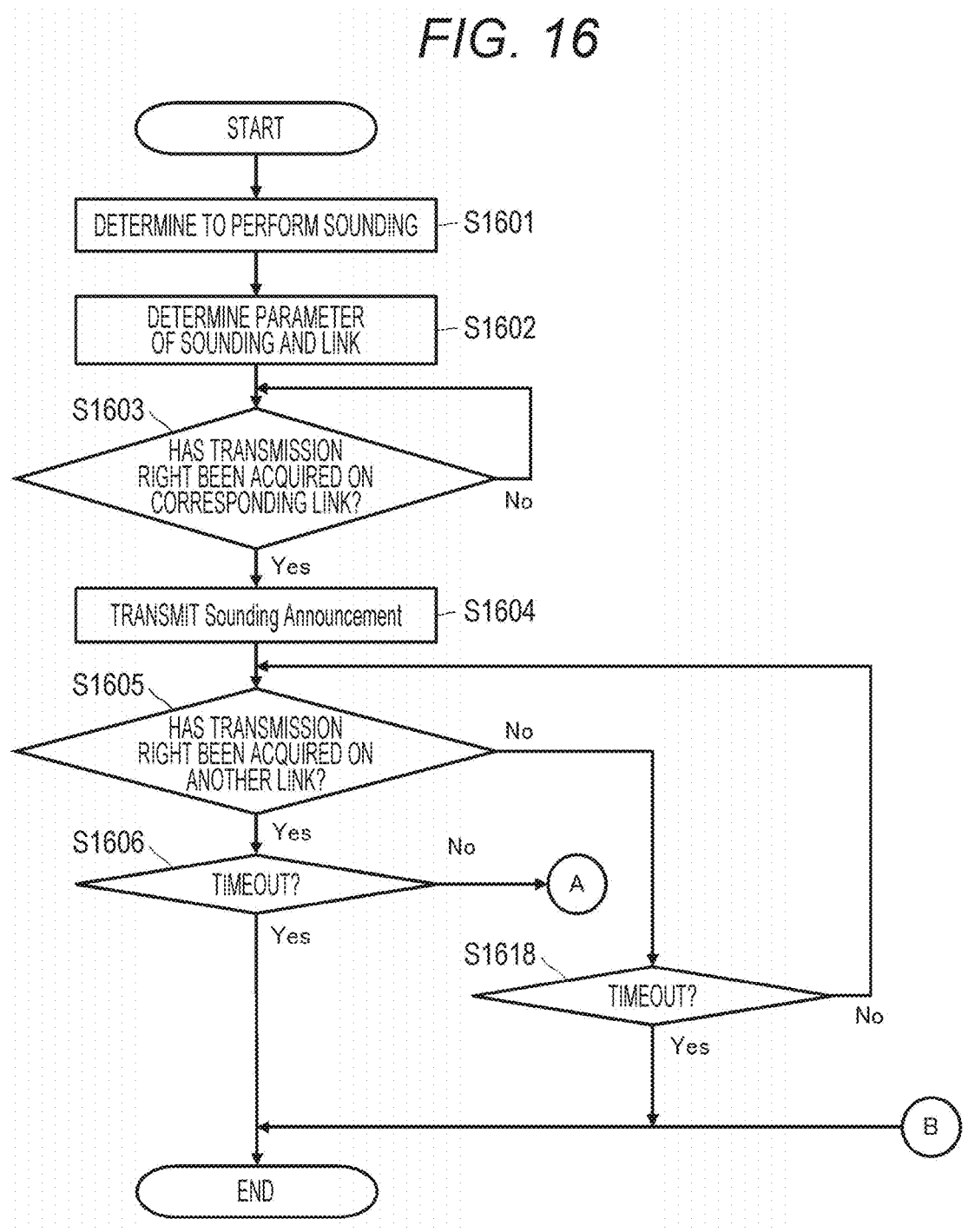
FIG. 16 is a flowchart illustrating a processing procedure executed by the AP MLD in a case where the sounding of the downlink is performed.
Figure 17:
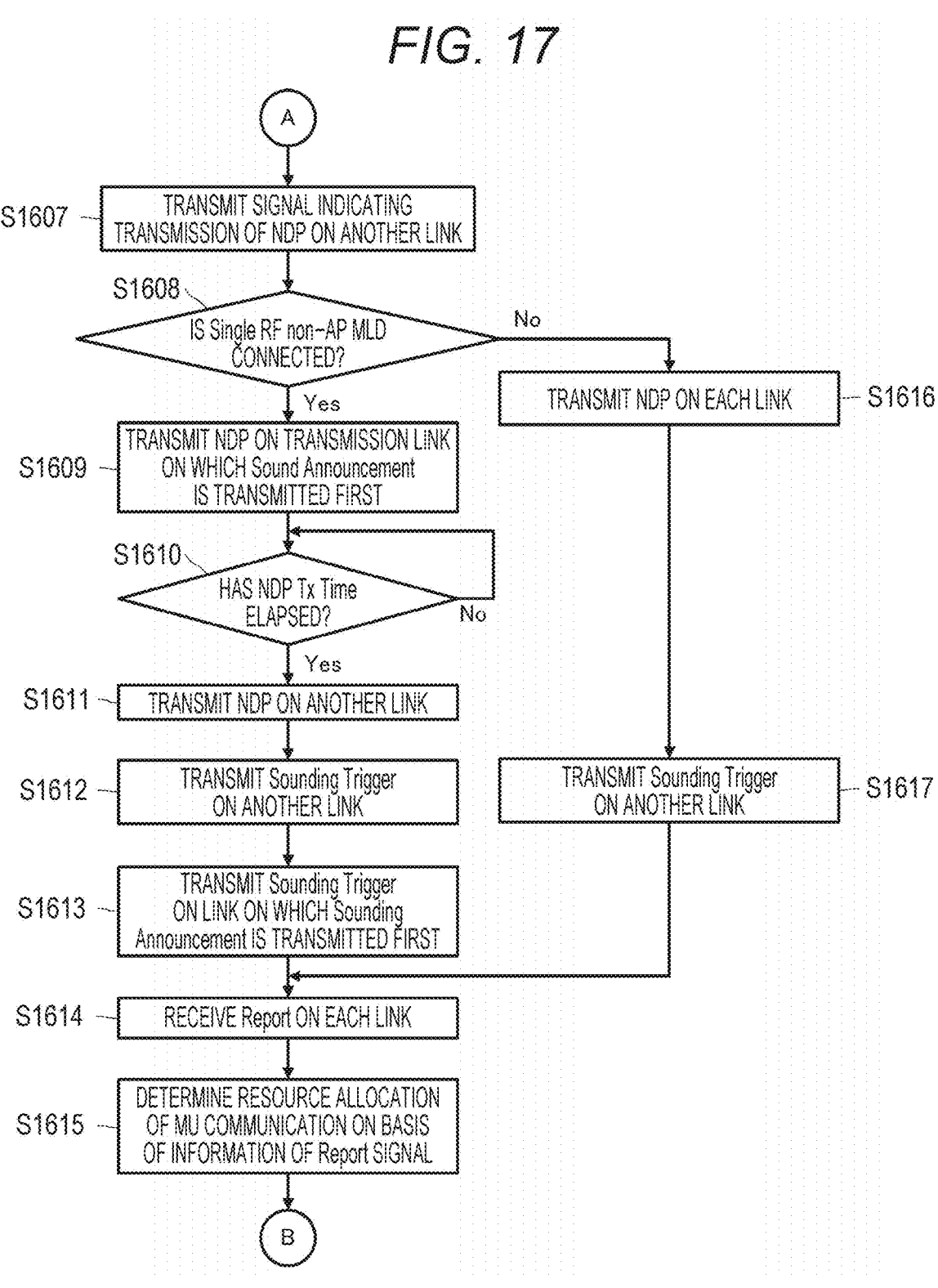
FIG. 17 is a flowchart illustrating a processing procedure executed by the AP MLD in a case where the sounding of the downlink is performed.

FIGS. 16 and 17 illustrate a processing procedure executed by the AP MLD in a case where the sounding of the downlink is performed in the form of a flowchart.

First, the AP MLD determines to perform the sounding of up-ring on the basis of a sounding request from the AP entity or on the basis of determination of the AP MLD itself (step S1601).

Next, the AP MLD determines a parameter of sounding and a link for starting sounding, and notifies the AP entity corresponding to each link for which sounding is determined to be started (step S1602).

Then, when the corresponding AP entity acquires the transmission right on the link for which sounding is determined to be started (Yes in step S1603), the AP entity transmits the Sounding Announcement signal indicating that the sounding of the downlink is started (step S1604).

When the corresponding AP entity acquires the transmission right on still another link (Yes in step S1605), the AP MLD checks whether the NDP Tx Timeout is exceeded (step S1606). In a case where the NDP Tx Timeout has been exceeded (Yes in step S1606), the AP MLD terminates the present processing.

Furthermore, if the NDP Tx Timeout has not been exceeded (No in step S1606), the AP entity that has obtained the transmission right in step S1605 transmits a signal indicating transmission of the NDP on the link for which the transmission right has been obtained (step S1607).

Here, whether the Single RF non-AP MLD is connected to the AP MLD is checked (step S1608).

In a case where the Single RF non-AP MLD is not connected to the AP MLD (No in step S1608), each AP entity of the AP MLD transmits the NDP signal on the corresponding link (step S1616), and then each AP entity of the AP MLD transmits the Sounding Trigger signal on the corresponding link (step S1617).

On the other hand, in a case where the Single RF non-AP MLD is connected to the AP MLD (Yes in step S1608). The AP entity that has first transmitted the Sounding Announcement signal transmits the NDP signal through a ring corresponding to the AP entity (step S1609). Then, when the NDP offset Time has elapsed (Yes in step S1610), another AP entity of the AP MLD transmits the NDP signal on another link (step S1611), and this AP entity further transmits the Sounding Trigger signal on the same link (step SX1612). Furthermore, the AP entity that has first transmitted the Sounding Announcement signal transmits the Sounding Trigger signal in the ring corresponding to the AP entity (step S1613).

When each AP entity transmits the Sounding Trigger signal on each link in steps S1612 and S1613 or step S1617, each AP entity receives the Report signal on the corresponding link (step S1614). Then, the AP MLD determines resource allocation for the UL and DL MU communication on the basis of the information of the Report signal received by each AP entity (step S1615), and ends the present processing. Note that the AP MLD may make a change request of the Enabled Link to Single RF non-AP MLD or a change request of the Configured Link to the non-AP MLD that sets the Configured Link on the basis of the channel state of each link determined on the basis of the received Report signal.

Furthermore, another link attempts to acquire the transmission right on the corresponding link until an NDP Tx Timeout is exceeded (No in step S1618) (step S1605). When the NDP Tx Timeout is exceeded (Yes in step S1618) while the AP entity does not acquire the transmission right on another link (No in step S1605), the AP MLD ends the present processing.

FIG. 18 illustrates a processing procedure executed by the Non-AP MLD in a case where the sounding of the downlink is performed in the form of a flowchart.

When the non-AP entity receives the Sounding Announcement signal from the connection destination AP MLD in one of the links (step S1801), the Non-AP MLD checks whether or not a link on which the Non-AP MLD itself receives the signal addressed to broadcast, that is, the Configured Link has been set (step S1802). In a case where the Configured Link has been set (Yes in step S1802), the Configured Link is set such that a subsequent signal addressed to broadcast is received by another link (step S1803).

Then, after receiving the Sounding Announcement signal from the AP MLD in another link (step S1804), the Non-AP MLD receives the NDP signal on the link corresponding to each non-AP entity, and observes the signal reception strength or the channel state on the basis of the reception result (step S1805).

Thereafter, upon receiving the Sounding Trigger signal that induces transmission of the Report signal for reporting a sounding result on each link (step S1806), the non-AP entity transmits the Report signal on the link on which the Sounding Trigger signal has been received on the basis of the information of the Sounding Announcement signal and the Sounding Trigger signal (step S1807), and ends the present processing.

Figure 19:
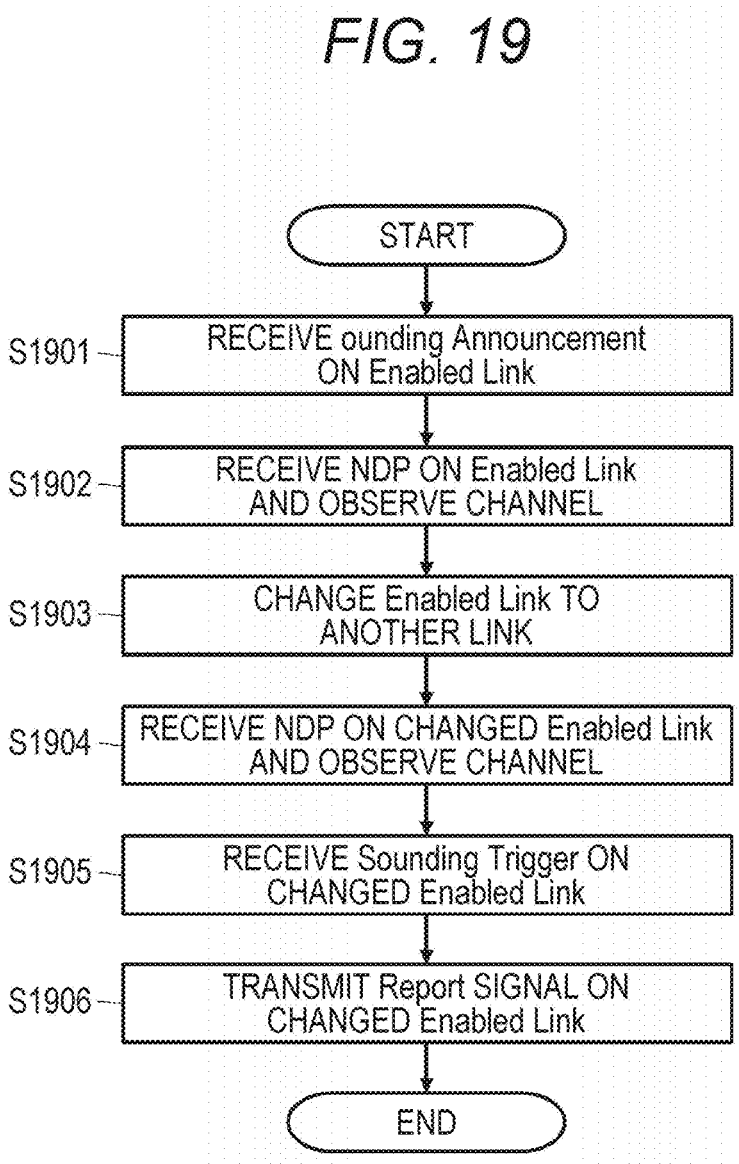
FIG. 19 is a flowchart illustrating a processing procedure executed by the Single RF non-AP MLD in a case where the sounding of the downlink is performed.

FIG. 19 illustrates a processing procedure executed by Single RF Non-AP MLD in a case where the sounding of the downlink is performed in the form of a flowchart.

In the Single RF non-AP MLD, after the corresponding non-AP entity on the Enabled Link receives the Sounding Announcement signal from the AP MLD of the connection destination (step S1901), the corresponding non-AP entity on the Enabled Link receives the NDP signal from the AP MLD of the connection destination, and observes the signal reception strength or the channel state on the basis of the reception result (step S1902).

Next, on the basis of the information regarding a time until the transmission of the NDP signal is started on another link indicated by the Sounding Announcement signal (step S1903), the Single RF non-AP MLD changes the Enabled Link to another link so as to be on the time.

Then, in the Single RF non-AP MLD, the corresponding non-AP entity receives the NDP signal from the connection destination AP MLD on the changed Enabled Link, and observes the signal reception strength or the channel state on the basis of a reception result thereof (step S1904).

Thereafter, upon receiving the Sounding Trigger signal that induces transmission of the Report signal for reporting the sounding result on the changed Enabled Link (step S1905), the Single RF non-AP MLD transmits the Report signal on the link on which the Sounding Trigger signal has been received on the basis of the information of the Sounding Announcement signal and the Sounding Trigger signal (step S1906), and ends the present processing.

INDUSTRIAL APPLICABILITY

The present disclosure has been described in detail above with reference to specific embodiments. However, it is obvious that those skilled in the art can make modifications and substitutions of the embodiment without departing from the gist of the present disclosure.

For example, by applying the present disclosure to a wireless LAN system conforming to the IEEE 802.11 standard, it is possible to observe a channel state for acquiring a channel characteristic with high time correlation, and to achieve high throughput. Of course, even when the present disclosure is applied to a wireless system conforming to another communication standard, a similar effect can be obtained.

In short, the present disclosure has been described by way of example, and the contents of the description herein should not be interpreted restrictively. In order to determine the gist of the present disclosure, the claims should be taken into consideration.

Note that the present disclosure can also employ the following configurations.

(1) A communication device that performs wireless communication using a plurality of links, the communication device including:

a first transmission unit that transmits a first signal including information regarding start of observation of a channel state in part of the plurality of links; and a second transmission unit that transmits a second signal inducing a signal including information regarding observation of a channel state in one or more links among the plurality of links.

(2) The communication device according to (1) above, in which the first signal includes information regarding a link for performing the observation.

(3) The communication device according to (1) above, in which the first signal includes information regarding a third signal for another communication device to observe a channel state.

(4) The communication device according to (3) above, in which the third signal is simultaneously transmitted on two or more links.

(5) The communication device according to (3) above, in which the third signal is transmitted on two or more links at different timings.

(6) The communication device according to (1) or (2) above, in which the second signal is a signal that induces a fourth signal for the communication device itself to observe a channel state.

(7) The communication device according to (6) above, in which resource allocation for multi-user communication is determined on the basis of information regarding the channel state observed by the communication device itself from the fourth signal transmitted from another communication device in response to the second signal.

(8) The communication device according to any one of (1), (3) to (5) above, in which the second signal is a signal that induces a fifth signal including information regarding a channel state observed by another communication device.

(9) The communication device according to (8) above, in which resource allocation of multi-user communication is determined on the basis of information regarding a channel state collected from the fifth signal transmitted by the another communication device in response to the second signal.

(10) The communication device according to (7) or (9) above, in which another communication device is requested to change a link for transmission and reception on the basis of the information regarding the channel state.

(11) The communication device according to (7) or (9) above, in which another communication device is requested to change a link for performing reception processing of a signal addressed to broadcast on the basis of the information regarding the channel state.

(12) A communication method for performing wireless communication using a plurality of links, the communication method including:

a first transmission step of transmitting a first signal including information regarding start of observation of a channel state in part of the plurality of links; and a second transmission step of transmitting a second signal inducing a signal including information regarding observation of a channel state in one or more links among the plurality of links.

(13) A communication device that performs wireless communication using a plurality of links, the communication device including transmitting a signal including information regarding observation of a channel state in one or more links among the plurality of links.

(14) The communication device according to (13) above, further including a first reception unit that receives a first signal including information regarding start of observation of a channel state in part of the plurality of links; and a second reception unit that receives a signal for inducing a second signal including information regarding observation of a channel state in one or more links among the plurality of links, in which a signal including information regarding observation of the channel state is transmitted in response to the first signal and the second signal.

(15) The communication device according to (13) or (14) above, in which the signal including the information regarding observation of the channel state is a fourth signal for another communication device to observe the channel state.

(16) The communication device according to (13) or (14) above, in which the signal including information regarding the channel state is a fifth signal including information regarding the channel state observed by the communication device itself.

(17) The communication device according to any one of (13) to (16) above, in which the signal including the information regarding the channel state includes information of transmission power of the signal.

(18) The communication device according to any one of (13) to (17) above, in which a link for performing transmission and reception is changed on the basis of a request from a transmission source of the first signal or information included in the first signal.

(19) The communication device according to any one of (13) to (17) above, in which a link for performing reception processing of a signal addressed to broadcast is changed on the basis of a request from a transmission source of the first signal or information included in the first signal.

(20) A communication method for performing wireless communication using a plurality of links, the communication method including transmitting a signal including information regarding observation of a channel state in one or more links among the plurality of links.

REFERENCE SIGNS LIST

200 Communication device
210 Communication unit
211 Communication control unit
212 Communication storage unit
213 Common data processing unit
214 Individual data processing unit
215 Signal processing unit
216 Wireless interface unit
217 Amplification unit
220 Control unit

230 Storage unit

240 Antenna

The invention claimed is:

1. A communication device that performs wireless communication using a plurality of links each of which is an independent frequency resource of a plurality of independent frequency resources usable by the communication device for performing the wireless communication, the communication device comprising:

first transmission processing circuitry configured to transmit, on a first link of the plurality of links that is a first one of the plurality of independent frequency resources, a first signal including information regarding a start of an observation of a channel state performed across the plurality of links, the information regarding the start of the observation of the channel state performed across the plurality of links including a sounding identifier and a succeeding link field identifying a second link of the plurality of links that is a second one of the plurality of independent frequency resources, the second link being different from the first link; and second transmission processing circuitry configured to transmit, on the second link of the plurality of links, a second signal inducing a signal including information regarding the observation of the channel state in one or more links among the plurality of links.

2. The communication device according to claim 1, wherein the first signal includes information regarding a link of the plurality of links for performing the observation.

3. The communication device according to claim 1, wherein the first signal includes information regarding a third signal for another communication device to observe the channel state.

4. The communication device according to claim 3, wherein the third signal is simultaneously transmitted on two or more links of the plurality of links.

5. The communication device according to claim 3, wherein the third signal is transmitted on two or more links of the plurality of links at different timings.

6. The communication device according to claim 1, wherein the second signal is a signal that induces a fourth signal for the communication device itself to observe the channel state.

7. The communication device according to claim 6, wherein resource allocation for multi-user communication is determined on a basis of information regarding the channel state observed by the communication device itself from the fourth signal transmitted from another communication device in response to the second signal.

8. The communication device according to claim 1, wherein the second signal is a signal that induces a fifth signal including information regarding the channel state observed by another communication device.

9. The communication device according to claim 8, wherein resource allocation of multi-user communication is determined on a basis of the information regarding the channel state collected from the fifth signal transmitted by the another communication device in response to the second signal.

10. The communication device according to claim 7, wherein the another communication device is requested to change a link of the plurality of links for transmission and reception on a basis of the information regarding the channel state.

11. The communication device according to claim 7, wherein the another communication device is requested to change a link of the plurality of links for performing reception processing of a signal addressed to broadcast on a basis of the information regarding the channel state.

12. A communication method for performing wireless communication using a plurality of links each of which is an independent frequency resource of a plurality of independent frequency resources usable for performing the wireless communication, the communication method comprising:

transmitting, on a first link of the plurality of links, a first signal including information regarding a start of an observation of a channel state performed across the plurality of links, the information regarding the start of the observation of the channel state performed across the plurality of links including a sounding identifier and a succeeding link field identifying a second link of the plurality of links that is a second one of the plurality of independent frequency resources, the second link being different from the first link; and transmitting, on the second link of the plurality of links, a second signal inducing a signal including information regarding the observation of the channel state in one or more links among the plurality of links.

13. A communication device that performs wireless communication using a plurality of links each of which is an independent frequency resource of a plurality of independent frequency resources usable by the communication device for performing the wireless communication, the communication device comprising:

first reception processing circuitry configured to receive, on a first link of the plurality of links that is a first one of the plurality of independent frequency resources, a first signal including information regarding a start of an observation of a channel state performed across the plurality of links, the information regarding the start of the observation of the channel state performed across the plurality of links including a sounding identifier and a succeeding link field identifying a second link of the plurality of links that is a second one of the plurality of independent frequency resources, the second link being different from the first link, second reception processing circuitry configured to receive, on the second link of the plurality of links, a second signal inducing a signal including information regarding the observation of the channel state in one or more links among the plurality of links, and transmission processing circuitry configured to transmit, in response to receiving the first signal and the second signal, the signal including the information regarding the observation of the channel state in the one or more links among the plurality of links.

14. The communication device according to claim 13, wherein the signal including the information regarding the observation of the channel state is a fourth signal for another communication device to observe the channel state.

15. The communication device according to claim 13, wherein the signal including the information regarding the observation of the channel state is a fifth signal including information regarding the channel state observed by the communication device itself.

16. The communication device according to claim 13, wherein the signal including the information regarding the observation of the channel state includes information of a transmission power of the signal.

17. The communication device according to claim 13, wherein a link of the plurality of links for performing transmission and reception is changed on a basis of a request from a transmission source of the first signal or information included in the first signal.

18. The communication device according to claim 13, wherein a link of the plurality of links for performing reception processing of a signal addressed to broadcast is changed on a basis of a request from a transmission source of the first signal or information included in the first signal.

19. A communication method for performing wireless communication using a plurality of links each of which is an independent frequency resource of a plurality of independent frequency resources usable for performing the wireless communication, the communication method comprising:

receiving, on a first link of the plurality of links that is a first one of the plurality of independent frequency resources, a first signal including information regarding a start of an observation of a channel state performed across the plurality of links, the information regarding the start of the observation of the channel state performed across the plurality of links including a sounding identifier and a succeeding link field identifying a second link of the plurality of links that is a second one of the plurality of independent frequency resources, the second link being different from the first link, receiving, on the second link of the plurality of links, a second signal inducing a signal including information regarding the observation of the channel state in one or more links among the plurality of links, and transmitting, in response to receiving the first signal and the second signal, the signal including information regarding the observation of the channel state in the one or more links among the plurality of links.

\* \* \* \* \*